United States Patent [19]

Olson et al.

[11] Patent Number: 5,377,338

[45] Date of Patent: Dec. 27, 1994

[54] APPARATUS AND METHODS FOR REDUCING NUMBERS OF READ-MODIFY-WRITE CYCLES TO A MEMORY, AND FOR IMPROVING DMA EFFICIENCY

[75] Inventors: Stephen W. Olson, Wilmington; James B. MacDonald, Dracut; Edward D. Mann, Methuen, all of Mass.; James W. Petersen, Jr., Hudson, N.H.

[73] Assignee: Wang Laboratories, Inc., Lowell, Mass.

[21] Appl. No.: 134,806

[22] Filed: Oct. 12, 1993

[51] Int. Cl.[5] .............................................. G06F 12/00
[52] U.S. Cl. ..................................... 395/375; 395/500; 395/425; 364/239.7; 364/243.5; 364/239
[58] Field of Search ......................... 395/425, 375, 500; 364/239.7, 243.5, 239

[56] References Cited

U.S. PATENT DOCUMENTS

| | | | |
|---|---|---|---|
| 4,412,286 | 10/1983 | O'Dowd et al. | 395/325 |
| 5,043,874 | 8/1991 | Gagliardo et al. | 395/425 |
| 5,056,011 | 10/1991 | Yoshitake et al. | 364/239.4 |
| 5,161,162 | 11/1992 | Watkins et al. | 371/29.5 |
| 5,237,567 | 8/1993 | Nay et al. | 395/425 |

Primary Examiner—Parshotam S. Lall
Assistant Examiner—Zarni Maung
Attorney, Agent, or Firm—Kenneth L. Milik

[57] ABSTRACT

Disclosed are methods and apparatus for interfacing a central processor (12) (CP) and an IO controller (30) (IOC) to a main memory (40). A CP and an IO write buffer each include a pair of memory input data registers, located in a pair of Memory Data Unit (MDU) integrated circuits (38a, 38b), and also two memory address registers, a previous memory address register, and an address comparator, located in a Memory Address Unit (MAU) (36). These registers, in conjunction with associated control logic, are used to buffer CP and IO write addresses and data to the main memory. If both address registers have a pending write, the last loaded address register is checked for a match against the current write address using the previous address register and the comparator. A match results in the combination of the previous write data and the current write data into one pending write, using write merge circuitry within the MDUs. IO read operations are performed by first loading the MDU read data registers with read data from memory locations specified by a quad-word aligned address in the first IO address register, followed by an incremented quad-word aligned address in the second IO address register. The transfer is then begun and all incoming IO read addresses are checked for a current quad-word compare. If an incoming quad-word aligned IO read address is not equal to the content of the IO previous address register, a memory read request is generated using the incremented address, and the MDU read data registers are advanced. A feature of this invention is that no specific addresses are used, and a knowledge of a transfer width (byte, word, etc.) is not required to determine memory operation types.

15 Claims, 22 Drawing Sheets

*FIG. 5*

| FIG. 6A | FIG. 6B |
| FIG. 6C | FIG. 6D |

*FIG. 3*

| FIG. 4A | FIG. 4B |
| FIG. 4C | FIG. 4D |

*FIG. 1*

| FIG. 2A | FIG. 2B |
| FIG. 2C | FIG. 2D |

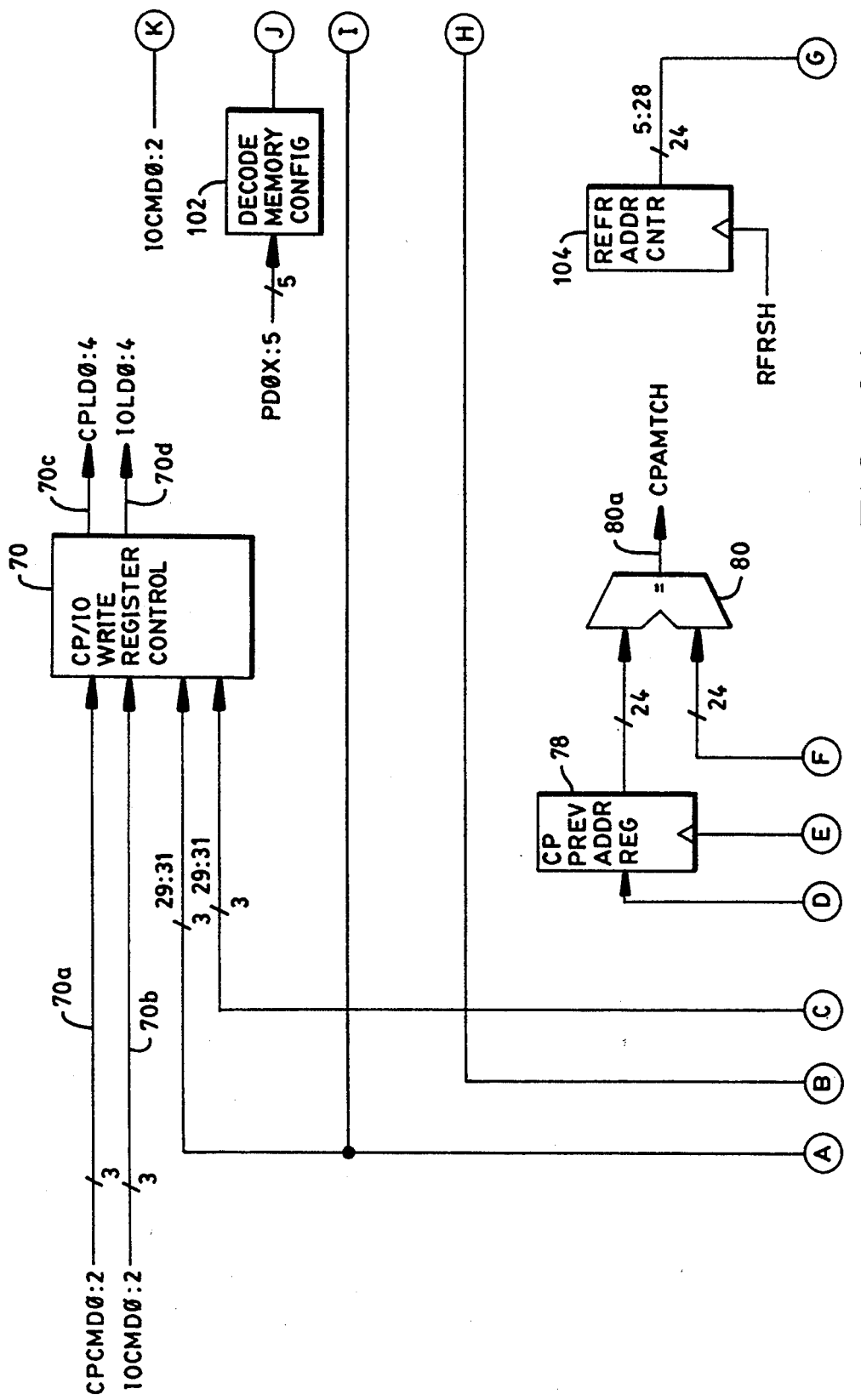

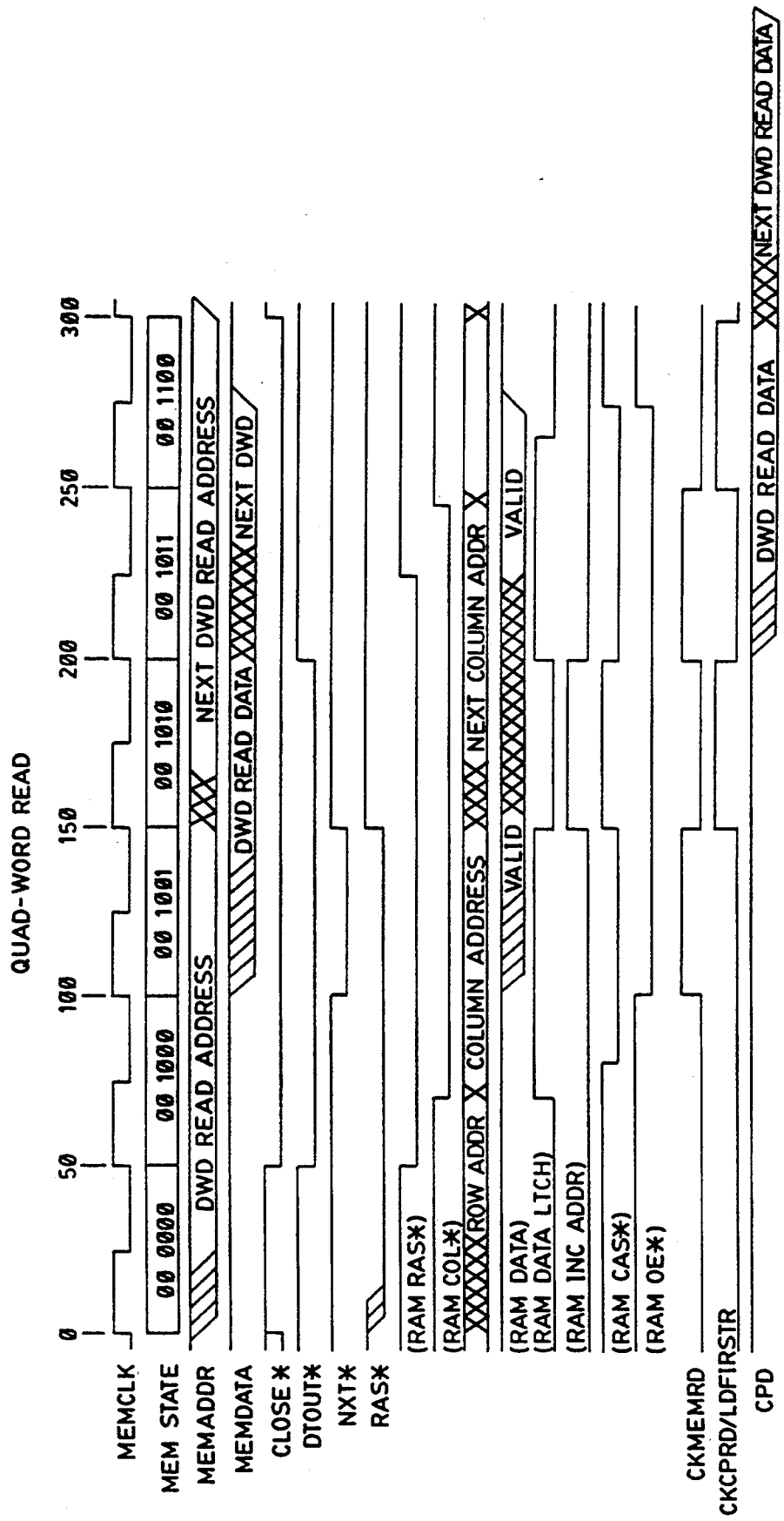

APPARATUS AND METHODS FOR REDUCING NUMBERS OF READ-MODIFY-WRITE CYCLES TO A MEMORY, AND FOR IMPROVING DMA EFFICIENCY

FIELD OF THE INVENTION

This invention relates generally to digital data processors and, in particular, to methods and apparatus for interfacing a central processor and an IO controller to a main memory.

BACKGROUND OF THE INVENTION

One problem that is encountered when operating a high performance digital data processor is in providing a sufficient main memory bandwidth to enable a central processor, and an IO controller, to operate at their optimum data transfer rates.

Another problem relates to a tendency of a central processor, for certain types of processing tasks, to make a number of writes to a relatively small region of main memory. If the writes are, for example, byte writes and if the main memory has a word width of a number of bytes, then typically a read-modify-write cycle is executed so as to modify only the intended byte within the word. However, a read-modify-write cycle requires a significantly longer time to accomplish than a conventional full word write, where all bytes within a word are written with the same write operation. As a result, the central processor may be required to wait until a previous read-modify-write operation is completed before terminating an on-going write request. As can be appreciated, it would be desirable to reduce the number of executed read-modify-write cycles so as to improve the efficiency of the data processor.

Another, related problem concerns the operation of the IO controller when transferring large blocks of data to or from the main memory. That is, it would be desirable to operate the main memory in such a manner that the IO controller is not required to incur wait states during memory writes or reads.

OBJECTS OF THE INVENTION

It is thus one object of this invention to provide methods and apparatus that provides an efficient main memory interface between a central processor and also between an I/O controller.

It is a further object of this invention to provide methods and apparatus that substantially reduce a number of read-modify-write cycles for a main memory.

It is another object of this invention to provide methods and apparatus for interfacing an I/O controller to a main memory to perform direct memory access (DMA) operations in an efficient and rapid manner.

SUMMARY OF THE INVENTION

The foregoing and other problems are overcome and the objects of the invention are realized by methods and apparatus for interfacing a central processor (CP) and an IO controller (IOC) to a main memory. In accordance with an aspect of this invention a CP write buffer includes a pair of memory input data registers (located in a pair of Memory Data Unit (MDU) integrated circuits) and also two memory address registers, a previous memory address register, and an address comparator (located in a Memory Address Unit (MAU). These registers, in conjunction with associated control logic, are used to buffer CP write addresses and data to the main memory. A purpose of the CP write buffer is to minimize the number of memory writes and CP stalls due to a memory busy condition. All CP 12 writes are loaded into one data/address register pair on the trailing edge of a CP write cycle and, if no other CP write requests are pending, one is requested. If a write request is pending, the other data/address register pair is used. If both register pairs have a pending write, the last loaded address register is checked for a match against the current write address using the previous address register and the comparator. A match results in the combination of the previous write data and the current write data into one pending write, using write merge circuitry within the MDUs. The previous address register is loaded when either of the other address registers are loaded.

By detecting write matches many CP write operations can be eliminated during, for example, loop-type operations where several writes occur within a small range of main memory addresses. The result is a significant reduction in CP generated memory activity, and a corresponding reduction in CP write stalls.

In accordance with a further aspect of this invention an IO bus to memory interface includes two memory IO address registers, a previous IO address register, an address comparator (all located in the MAU), and two memory write buffers each having associated modified or mark bit registers (located within the MDUs). The MDUs also include a memory read data FIFO. The IO interface provides an efficient, high speed buffering mechanism that accommodates several types of IO DMA transfers with a small amount of control logic, while retaining a sufficient amount of residual memory bandwidth for CP and refresh accesses.

The IO interface operates in one of two modes, IO write transfers to main memory and IO read transfers from main memory. During IO to memory transfers each IO write causes the IO previous address register and one of the memory address registers to be loaded with the memory write address, along with appropriate data and modified flag(s) being loaded within the MDUs. Subsequent writes load the same registers if the comparator indicates and address match between the IO address and the content of the IO previous address register. If no match is indicated, a memory request is generated and the other register is used.

IO read operations are performed by first loading the MDU read data registers with read data from memory locations specified by a quad-word aligned address in the first IO address register, followed by an incremented quad-word aligned address in the second IO address register. The transfer is then begun and all incoming IO read addresses are checked for a current quad-word compare. If an incoming quad-word aligned IO read address is not equal to the content of the IO previous address register, a memory read request is generated using the incremented address, and the MDU read data registers are advanced.

A significant feature of this aspect of the invention is that no specific addresses are used, and a knowledge of a transfer width (byte, word, etc.) is not required to determine memory operation types. That is, so long as an incoming IO read address is within a quad-word of the quad-word aligned address stored in the IO previous address register, the requested data is supplied to the IO sub-system for transfer to a requesting agent, such as a disk or communication port.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 illustrates the arrangement of FIGS. 2A–2D;

FIG. 3 illustrates the arrangement of FIGS. 4A–4D;

FIGS. 4A–4D are each a portion of a block diagram of a Memory Address Unit (MAU) that is a component of the block diagram of FIGS. 2A–2D, and is specifically illustrated in FIG. 2A;

FIG. 5 illustrates the arrangement of FIGS. 6A–6D;

FIGS. 7–10 are timing diagrams that illustrate, for the data processor shown in FIGS. 2A–2D, a Quad-Word Memory Read operation, a Central Processor (CP) Memory Write operation, a Word/Double-Word Memory Write operation, and a Partial Word Memory Write operation, respectively.

DETAILED DESCRIPTION OF THE INVENTION

Figure 2A:
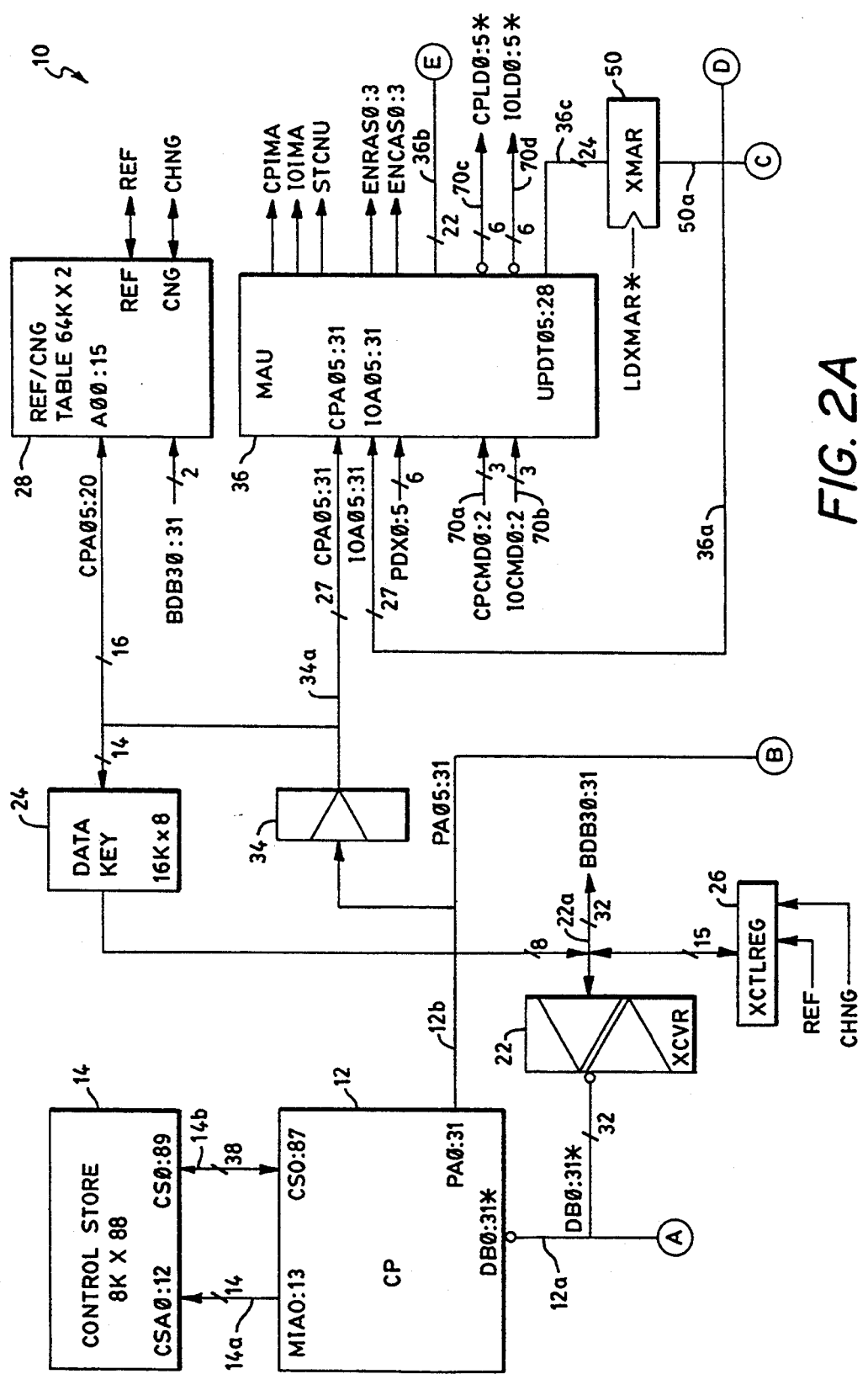
FIGS. 2A–2D are each a portion of a block diagram of a data processor that is constructed and operated in accordance with this invention.
Figure 2B:
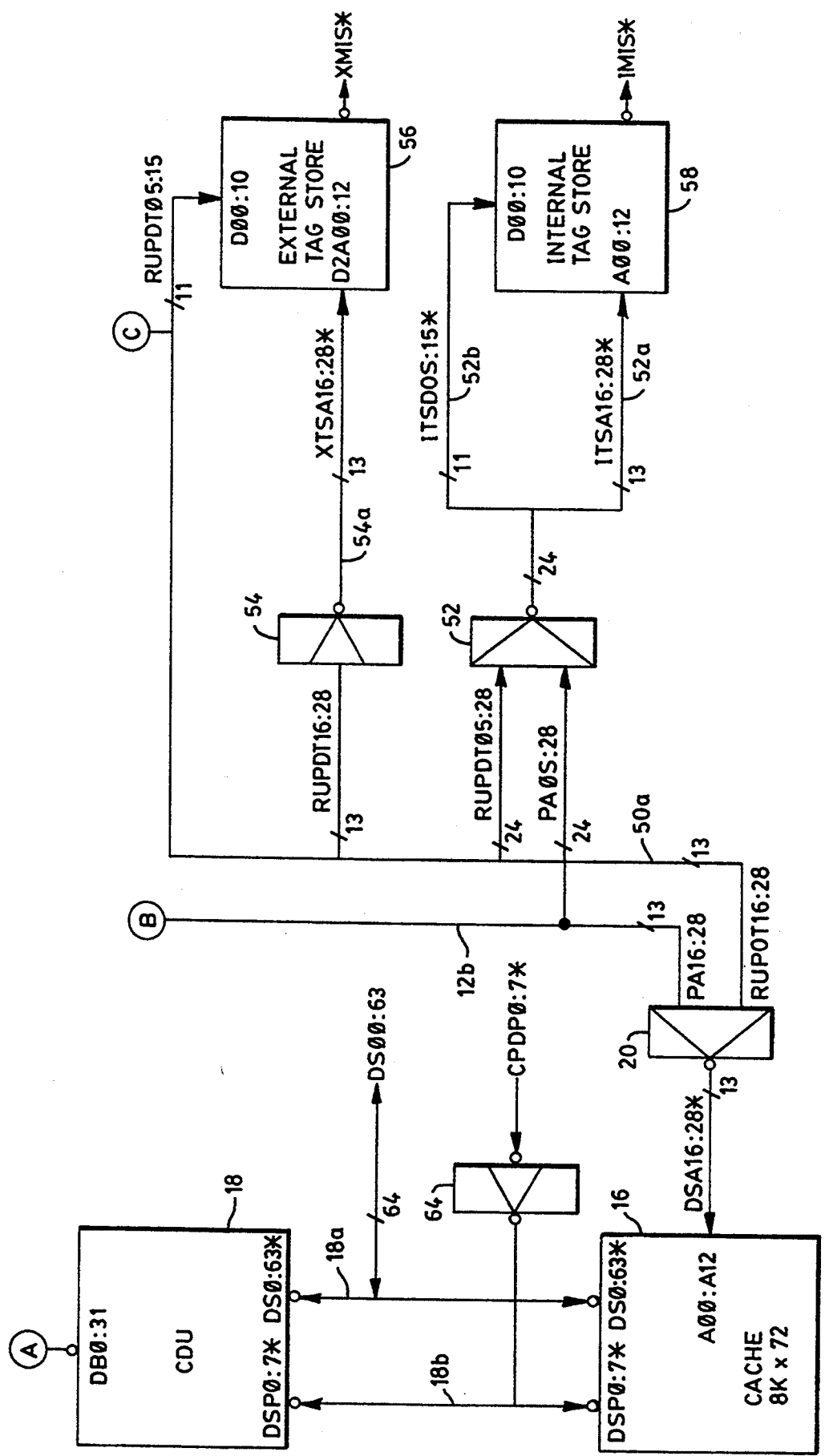
Figure 2C:
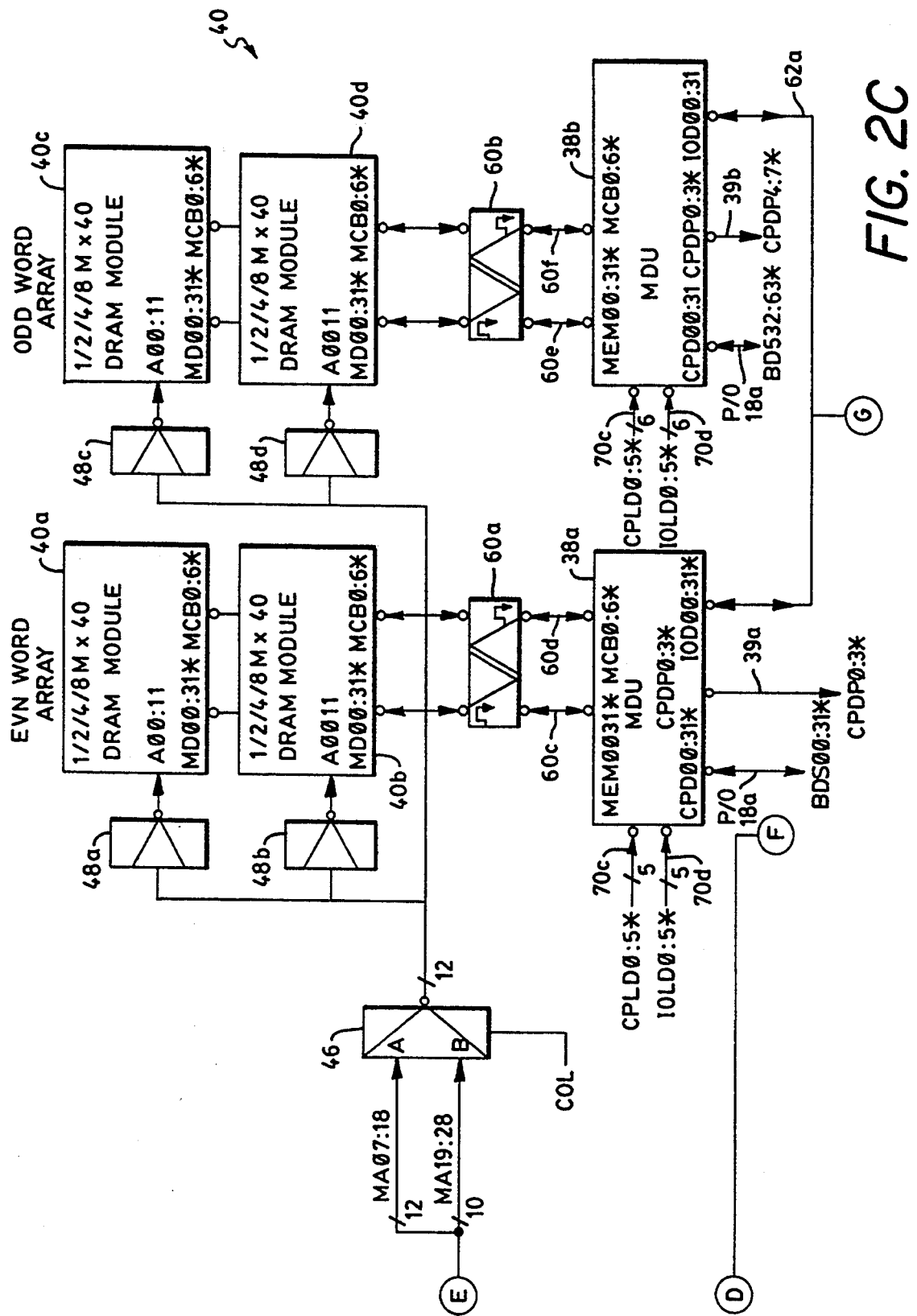

Reference is made to FIGS. 2A–2D for the ensuing description of a data processor 10 that is constructed and operated in accordance with this invention. A Central Processor (CP) 12 is coupled to an 8K by 88-bit Control Store 14 by a 14-bit control store address bus 14a and an 88-bit control store data bus 14b. The Control Store 14 stores microinstructions which are read into the CP 12 in order to execute macroinstructions that are read from an 8K by 72-bit CACHE memory 16, via a CACHE Data Unit (CDU) 18, bidirectional 64-bit data bus BDS00:63 18a, and bidirectional 32-bit data bus DB00:32 12a.

Macroinstructions are fetched from the CACHE memory 16 in accordance with physical addresses provided by the CP 12 on a 32-bit physical address bus (PA0:31) 12b, via a CACHE address multiplexer (MUX) 20. The CACHE address MUX 20 is employed when pre-filling the CACHE 16 with instructions and data. In this embodiment of the invention only PA bits 16:28 are provided to the CACHE 20. PA bit 28 being provided as the LSB address bit enables a Double-Word (eight bytes or two 32-bit words) to be read by the CP 12 over the 64-bit bus 18a and 32-bit bus 12a. The eight bit DSP0:7 bus 18b conveys data parity bits between the CACHE 16 and the CDU 18. The CDU 18 operates as a data buffer for interfacing the 32-bit CP 12 data bus 12a to the 64-bit cache/main memory data bus 18a, as a data error checker, and provides data alignment for the CP 12.

In the presently preferred embodiment of this invention the macroinstructions that are read from the CACHE 16 are those that implement a VS assembly language program that is provided by Wang Laboratories Inc. of Lowell MA.

The 32-bit processor data bus 12a is buffered by a transceiver 22 and is provided as a buffered data bus (BDB0:31) 22a to several locations, including a 16K by 8-bit Data Key memory 24, a 16-bit control and status register (XCTLREG) 26, a reference and change table (REF/CNG TABLE) 28, and a system (backplane) Bus Interface Chip (BIC) 30. This data path gives the CP 12 an ability to send control information to, and read status information from, these various devices.

The Data Key memory 24 stores encrypted information and provides a capability to enable only specified software packages to be executed by the CP 12. The REF/CNG Table 28 functions to indicate a reference to a particular page of memory, and to indicate if the reference was a write operation. The BIC 30 provides an interface to other components that are coupled to the system bus 32, the system bus including a 32-bit multiplexed address/data bus (AD31:0) 32a, associated parity lines (PAR3:0) 32b, and control signal lines 32c. In general, the BIC 30 operates to arbitrate access to the system bus 32 and to perform all necessary handshaking with other devices that are coupled to the system bus 32. The XCTLREG 26 enables control over the CACHE memory 16, indicates CACHE status, and also provides indications of correctable and uncorrectable data errors.

A buffer 34 drives the PA bus 12b as a CP Address (CPA) bus 34a to the Data Key 24 (14 bits), the REF/CNG Table 28 (16 bits) and a Memory Address Unit (MAU) 36 (27 bits). The MAU 36 is shown in greater detail in FIGS. 4A–4D. The MAU 36 operates to queue memory read and write addresses and functions, in conjunction with even and odd Memory Data Units (MDUs) 38a and 38b, respectively, (FIGS. 6A–6D), to write and read data from main memory 40. Main memory 40 is comprised of a plurality of DRAM modules 40a–40d, and is organized as an even word array (modules 40a and 40b) and as an odd word array (modules 40c and 40d). The total width of the main memory 40 is 64 bits (a double word), plus 14 bits of parity information. Parity is determined separately on each odd and even 32-bit memory word.

The MAU 36 also receives a 27-bit I/O address (IOA) bus 36a that is sourced from the BIC 30 via a Buffered Address (BA) bus 30a and a latch 42. IOA bus 36a provides a first memory address of a data block that is to be written to or read from by an I/O device that is coupled to the system bus 32. The first address is received though a transceiver 44, a buffered address/data (BAD) bus 44a, and a transceiver 45. Transceiver 45 is enabled to pass the first memory address of the memory block to the BIC 30 and the latch 42, via the BA bus 30a. In the MAU 36 the first address is buffered, and subsequent memory addresses are incremented by the BIC 30 during an I/O operation and provided over the buses 30a and 36a, via latch 42. This enables a potentially large number of reads or writes to be made to consecutive memory locations of the main memory 40. The operation of the MAU 36 will be described below in greater detail.

One output of the MAU 36 is a 22-bit memory address (MA) bus 36b that is applied to a row/column MUX 46 which has a 12-bit output for sequentially providing row and column addresses, via drivers 48a–48d, to the DRAM modules 40a–40d, respectively. The row/column MUX 46 operates under the control of a COL signal that is generated by a memory control state machine that forms a part of a memory controller 31.

Another output of the MAU 36 is a 24-bit update address (UPDT) bus 36c that is latched by a register XMAR 50. XMAR 50 sources a registered update address (RUPDT) bus 50a to the MUX 20 (13 bits), to a MUX 52 (24 bits), to a driver 54, and to an External Tag Store 56. Also provided to MUX 52 is the PA bus 12b. The output of the MUX 52 is a 13-bit internal tag store address (ITSA) bus 52a and an 11-bit internal tag store data (ITSD) bus 52b which are applied to an Internal Tag Store 58. The output of the driver 54 is a 13-bit external tag store address (XTSA) bus 54a which is applied to the External Tag Store 56, in conjunction with 11-bits of the RUPDT bus 50a. The External Tag Store 56 and the Internal Tag Store 58 provide CACHE hit and miss detection, XMIS and IMIS, respectively, for I/O accesses and CP 12 accesses, respectively.

The MDUs 38a and 38b operate in conjunction with registered buffers 60a and 60b, respectively, to provide a data queue for read and write accesses of the main memory 40. The MDUs 38a and 38b also each provide for word-wide ECC generation and checking functions for data going to and coming from the main memory 40. Each of the MDUs 38a and 38b is bidirectionally coupled to one word (32-bits) of the 64-bit buffered data store (BDS) bus 18a, and thereby to the CACHE 16 and to the CDU 18. Each of the MDUs 38a and 38b also source 4-bits of the 8-bit CP Data Parity (CPDP) bus which is provided through a buffer 64 to the eight bit DSP0:7 bus 18b that conveys data parity bits between the CACHE 16 and the CDU 18. The MDUs 38a and 38b each also have a 32-bit I/O data path (IOD) and are bidirectionally coupled in parallel to a transceiver 62 and thence to the BAD bus 44a. For I/O data transfers to or from the system bus 32 the MDUs are alternately selected to either transmit up to 32-bit word to the transceiver 62, or receive up to a 32-bit word from the transceiver 62. The MDUs 38a and 38b are described below in greater detail.

Figure 14:
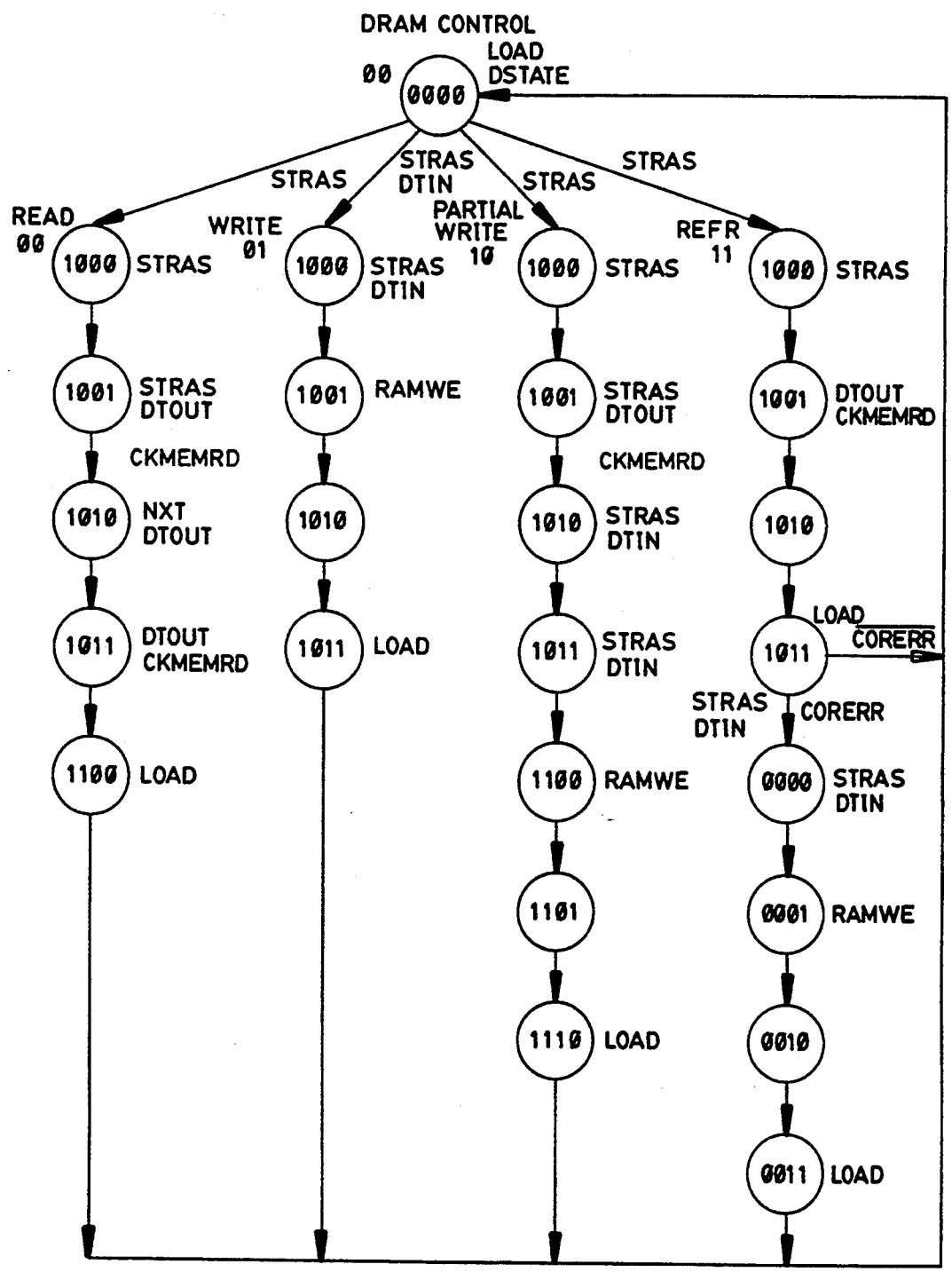
Figure 15:
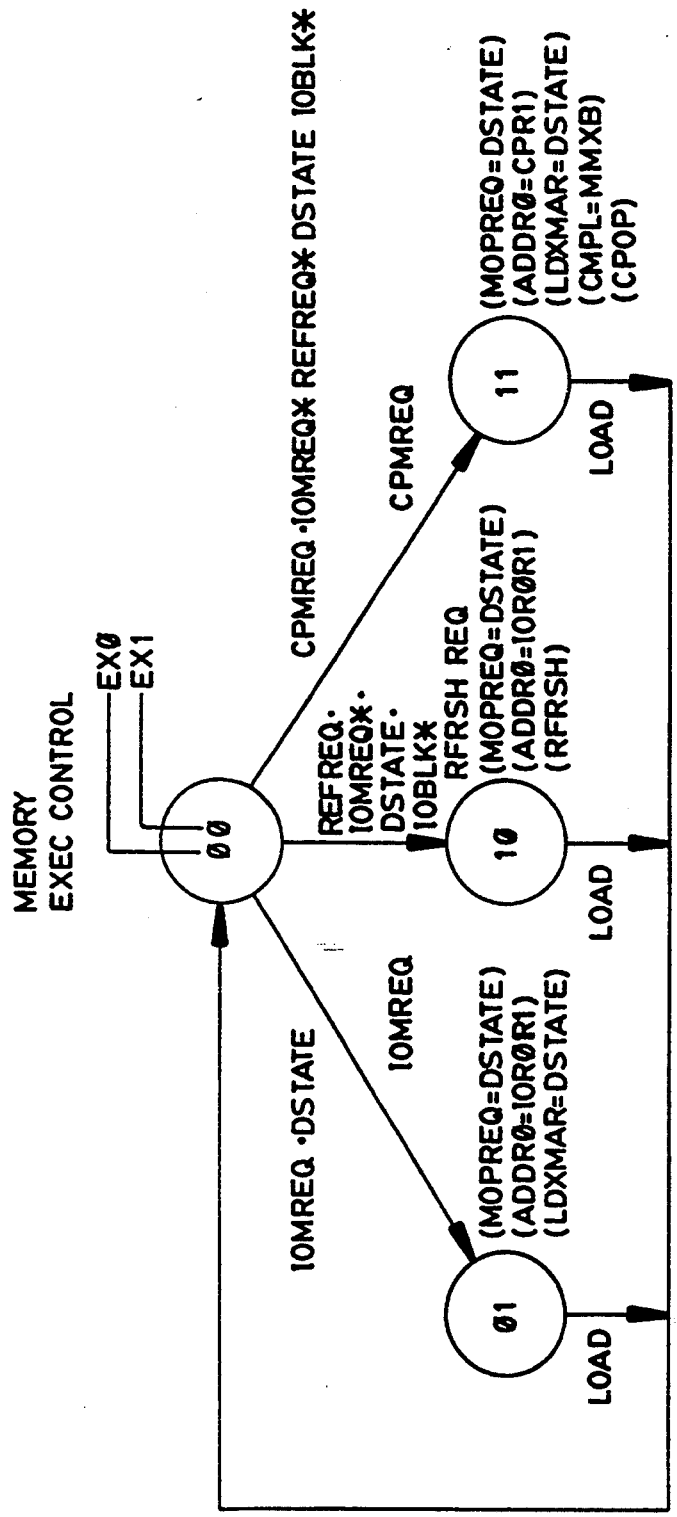

The above-mentioned memory controller 31 (FIG. 2D) includes a memory request arbitration state machine (FIG. 15) that is responsive to CP memory requests, IO memory requests, and Refresh memory requests. The memory controller 31 also includes a DRAM control state machine (FIG. 14). The memory controller 31 operates to control access to, and the sequencing of, the main memory 40. The timing signals that are generated by the memory controller 31 are shown in FIGS. 7-10 for a quad-word read, CP write, word/double-word write, and partial or read-modify-write (RMW) operations, respectively.

The data processor 10 of FIGS. 2A-2D, in a presently preferred embodiment of the invention, is packaged on a single multi-layered printed circuit board. The CDU 18, MAU 36, the MDUs 38a and 38b, and the BIC 30 are each contained within an Application Specific Integrated Circuit (ASIC). A CP 12 cycle is a minimum of 50 nanoseconds in duration (20 MHz clock frequency), and is comprised of two or more 50% duty cycle 25 nanosecond sub-cycles or "ticks". The CP 12 clock is synchronized to a 50 nanosecond clock signal (not 50% duty cycle) that is provided on the system bus 32. A presently preferred technique for deriving the synchronized 50% duty cycle 25 nanosecond (40 MHz) clock ticks from the 20 MHz, non-50% duty cycle system bus clock is described in commonly assigned patent application Ser. No. 08/135,133, filed Oct. 12, 1993, entitled "Synchronous Clock Frequency Multiplier and Squarer" by J. MacDonald.

Reference is now made to FIGS. 4A-4D which illustrate the construction of the MAU 36 that is shown in FIG. 2A. A CP/IO Write Register Control 70 receives as inputs a 3-bit CP command (CPCMD) 70a, a 3-bit IO command (IOCMD) 70b, the three LSBs of the CP address (CPADR) bus 34a, and the three LSBs of the IO address (IOADR) bus 36a. Based on this information the Write Register Control 70 provides a first 5-bit code (CPLD) 70c that specifies to the MDUs 38a and 38b a CP 12 data modifier field, and a second 5-bit code (IOLD) 70d that specifies to the MDUs 38a and 38b an IO data modifier field. As such, CPLD and IOLD are employed during write operations, as described below, to cause the loading into the MDU 38 of a designated byte or bytes, and to set Mark bits accordingly.

The MAU 36 also includes an Address Register clock enable block 72 that receives two CP 12 clock signals (CKCP) 72d and which outputs clocks 72a, 72b, and 72c to a first CP Address Register (CP ADDR REG0) 74, a second CP Address Register (CP ADDR REG1) 76, and a CP Previous Address Register 78, respectively.

Figure 2D:
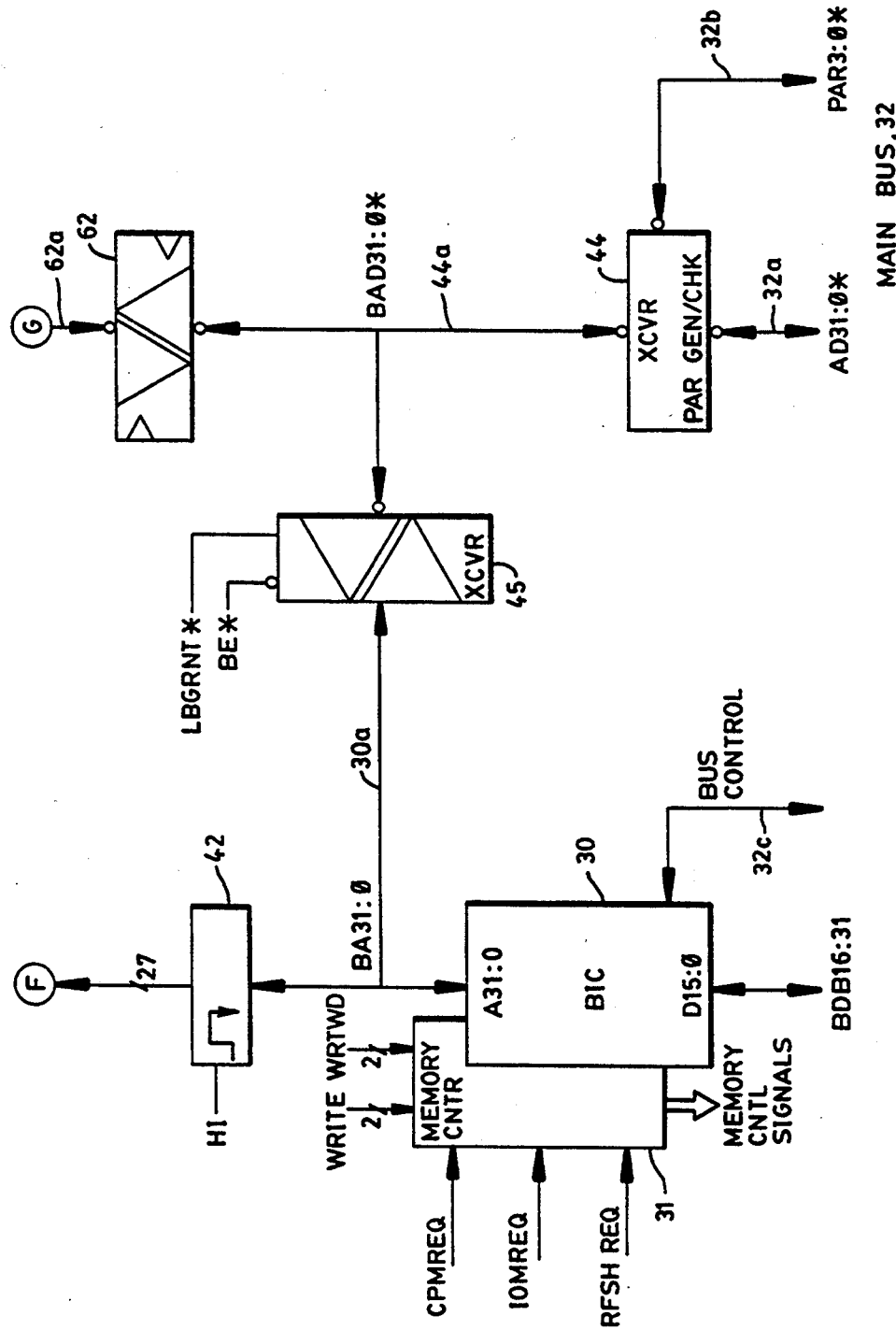
Figure 4B:
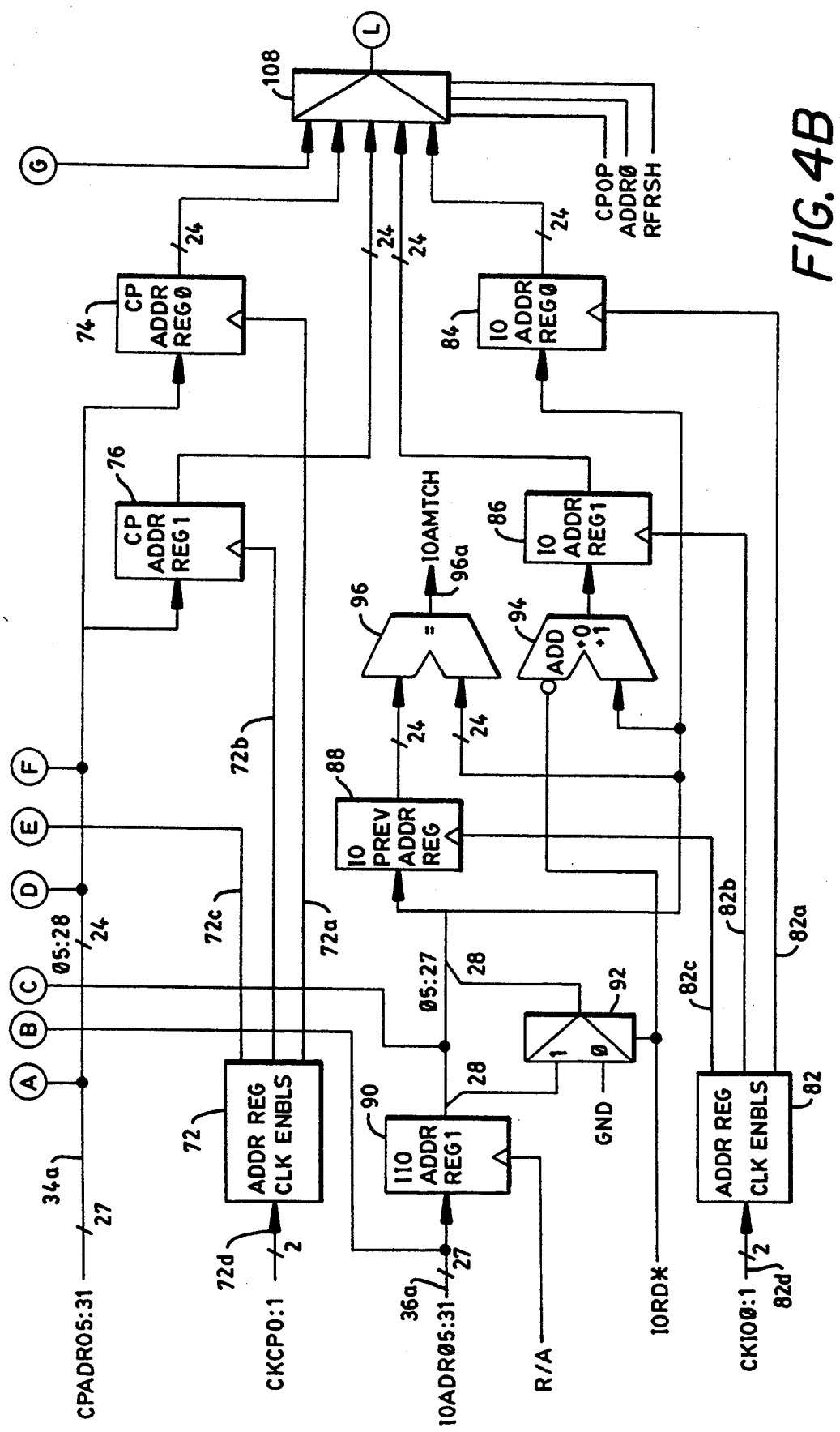
Figure 4C:
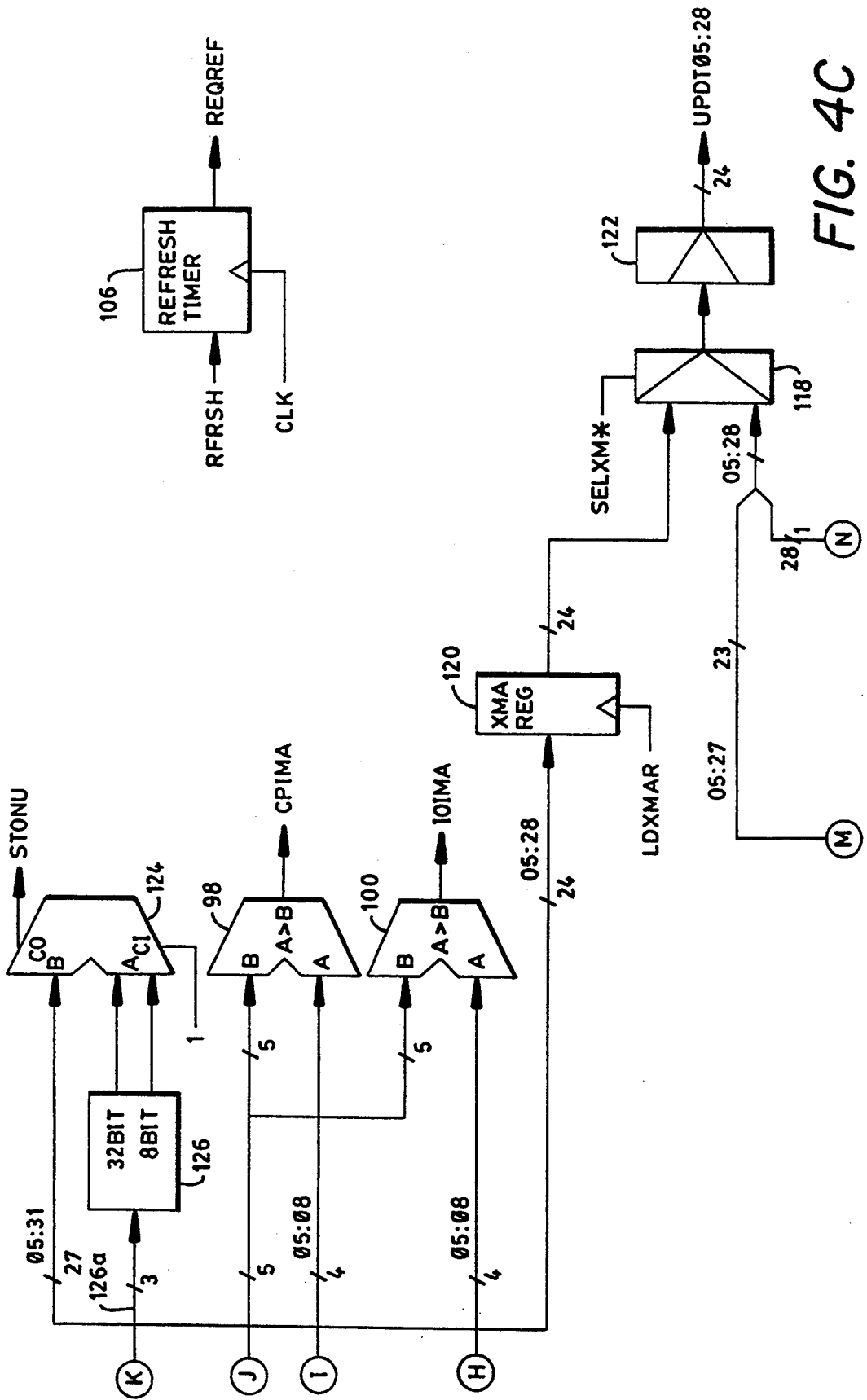
Figure 4D:
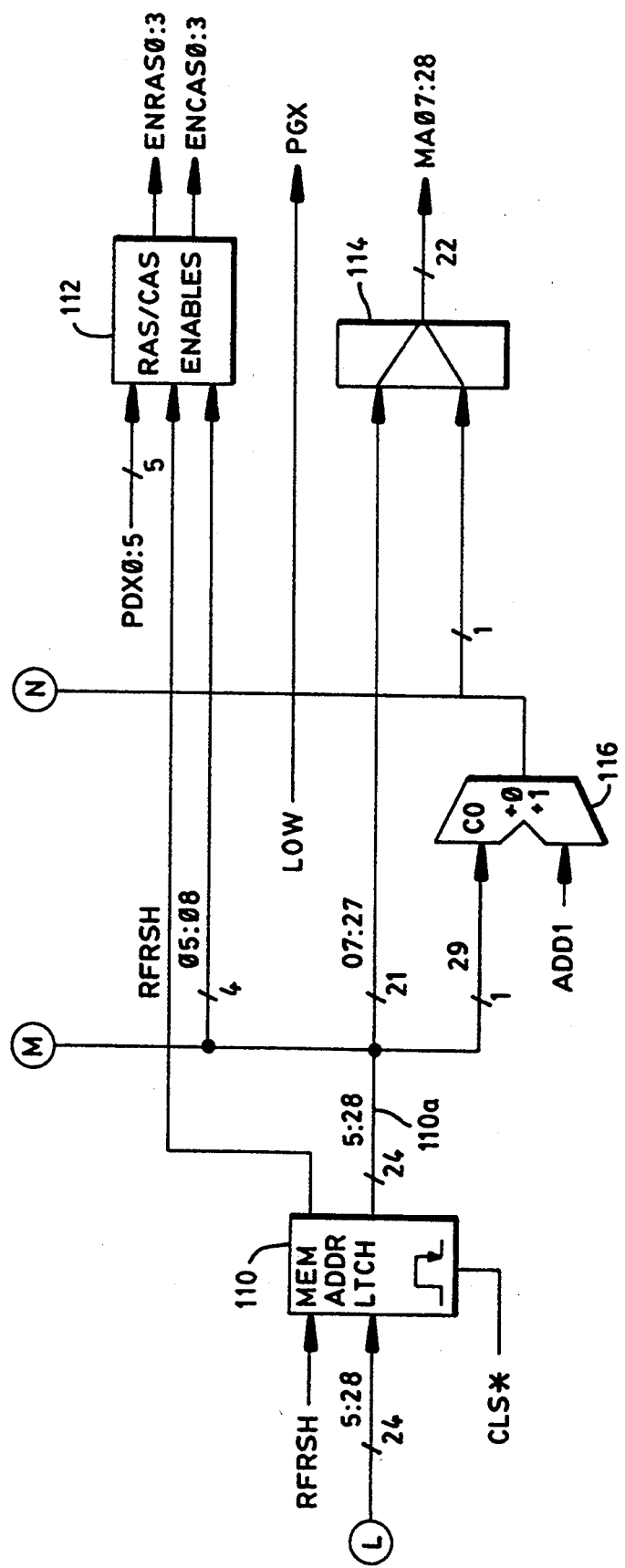
Figure 11:
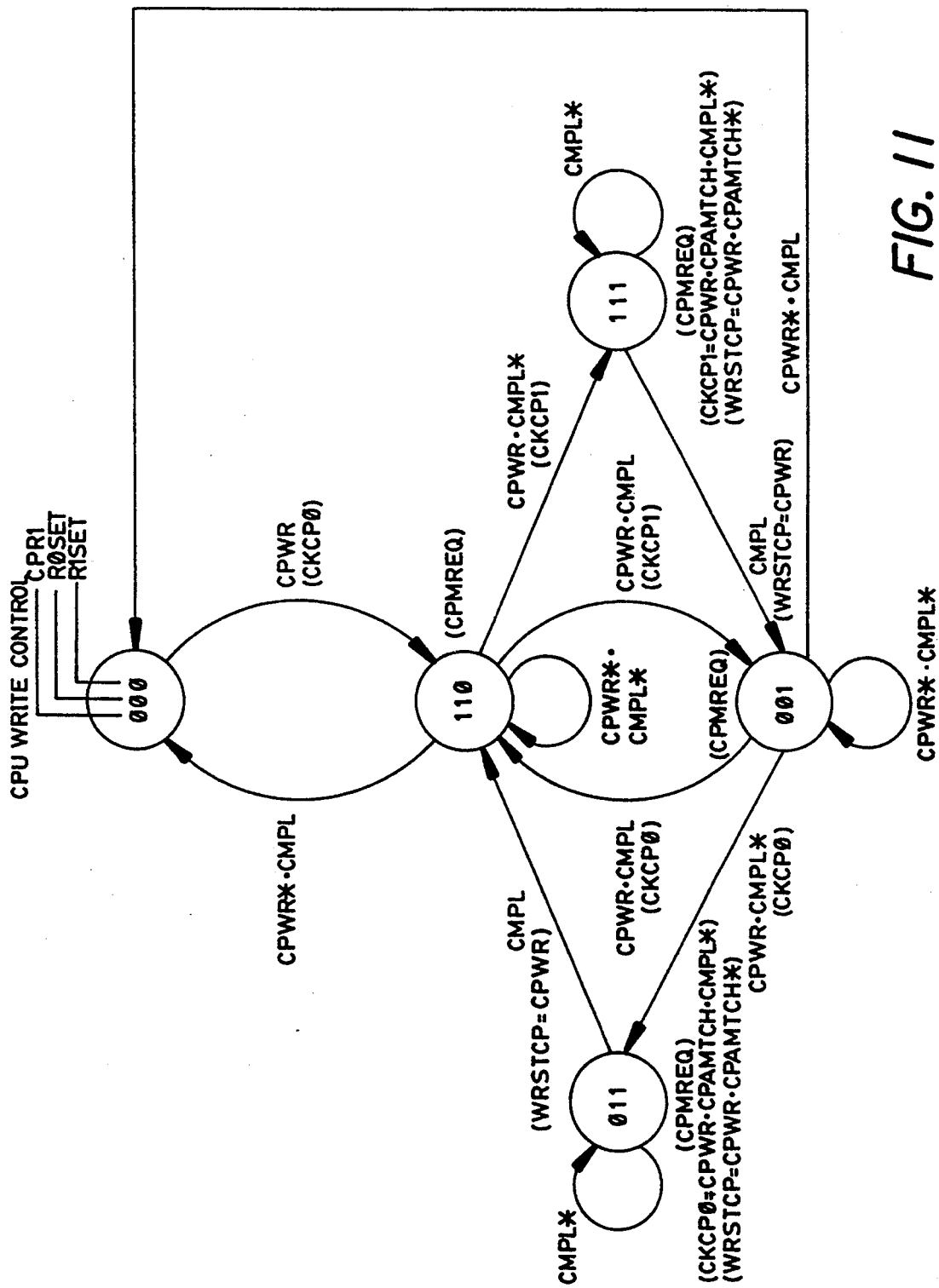
FIGS. 11–15 are state diagrams that illustrate, for the data processor shown in FIGS. 2A–2D, the operation of a CP Write Control state machine, a CP Read Control state machine, an I/O Memory Control state machine, a Dynamic Random Access Memory (DRAM) state machine, and a memory request execution state machine, respectively.

As is depicted in the state diagram of FIG. 11, for a first CP 12 memory write operation (State 110 of FIG. 11) 24-bits (05:28) of the associated memory address are latched from the CPADR bus 34a into the CP ADDR REG0 74 (CKCP0), and also into the CP Previous Address Register 78, and a CP Memory Request (CPMREQ) is asserted to the memory controller 31 of FIG. 2D. The CP Write State machine stays in State 110 if another CP write does not occur (CPWR*) and so long as the requested CP memory write operation does not complete (CMPL*). If the write operation completes (CMPL) without the occurrence of another CP write (CPWR*), then the State 000 is re-entered.

If the memory operation is not completed (CMPL*) before a next CP 12 memory access (CPWR), then 24-bits of the next memory address are latched into the CP ADDR REG1 76 (CKCP1), and also into the CP Previous Address Register 78, and State 111 is entered. It is noted that the CP Previous Address Register 78 is clocked whenever CP ADDR REG0 74 or CP ADDR REG1 76 is clocked to store the CP write address that is being received.

In State 111 another CP memory request is issued to the memory controller 31 (CPMREQ), and the state machine remains in State 111 until the memory request for the first CP write operation completes (CMPL). While in State 111 CP ADDR REG1 76 is clocked (CKCP1) on the occurrence of another CP write, and if a comparator 80 indicates a match (CPAMTCH 80a) between the CP write address being received and the CP write address that is stored in the CP PREV ADDR REG 78, and if the previously requested memory operation has not completed. That is, CKCP1=CPWR and CPAMTCH and CMPL*. The assertion of CPAMTCH 80a indicates that the current CP write operation is directed to the same double word of memory as the previous CP write operation whose address is stored in CP ADDR REG1 76. The CPAMTCH signal 80a is output from the MAU 36 and is used by the state machine of FIG. 11 to selectively combine the current write data with registered write data from one or more previous and yet unexecuted CP write operations. The specifics of the MDU 38 write merge operation are described below.

In State 111, and if a CP write is received that does not generate a match with the content of the CP PREV ADD REG 78 (CPAMTCH*), then a write stop (WRSTCP) signal is asserted to halt the CP write operation. This is accomplished in response to the occurrence of two buffered CP write operations, and the generation of a third that is not directed to the same double word as the last CP write operation whose address is buffered in CP ADDR REG 1 76.

As was noted before, when the first requested CP write operation (associated with the address stored in CP ADDR REG0 74) completes (CMPL), State 001 is entered. The CP write stop signal is also removed. The state machine stays in State 001 so long as there is not another CP write (CPWR*), and there is no completion of the second CP memory request that was issued for the address stored within CP ADDR REG1 76. If this last CP memory request completes (CMPL) without the arrival of another CP write (CPWR*), then State 000 is reentered. If another CP write operation does occur (CPWR), and if the memory write operation also completes (CMPL), then State 110 is entered and CP ADDR REG0 74 is clocked (CKCP0) to store the current write address. The assertion of CKCP0 also causes the CP write address to be stored within the CP PREV ADDR REG 78. If, however, another CP write operation occurs (CPWR) before the memory write operation completes (CMPL*), then State 011 is entered and CP ADDR REG0 74 is clocked (CKCP0) to store the associated write address. As before, the assertion of CKCP0 also causes the CP write address to be stored within the CP PREV ADDR REG 78.

The operation of State 011 is similar to that of State 111. That is, in State 011 a CP memory request (CPMREQ) is issued to the memory controller 31, and the state machine remains in State 011 until the memory request for the second CP write operation completes (CMPL). While in State 011 CP ADDR REG0 74 is clocked (CKCP0) on the occurrence of another CP write, and if the comparator 80 indicates a match (CPAMTCH) between the CP write address being received and the CP write address that is stored in the CP PREV ADDR REG 78, and if the previously requested memory operation has not completed. That is, CKCP0=CPWR and CPAMTCH and CMPL*. As before, the assertion of CPAMTCH 80a indicates that the received CP write operation is directed to the same double word of memory as the previous CP write operation whose address is stored in CP ADDR REG0 74.

In State 011, and if a CP write address is received that does not generate a match with the content of the CP PREV ADD REG 78 (CPAMTCH*), then the write stop (WRSTCP) signal is asserted to halt the CP write operation. The state machine remains in State 011 until the CMPL signal is received (indicating the write operation associated with the memory address stored in CP ADDR REG1 76 has completed), at which time a transition is made to State 110.

Figure 12:
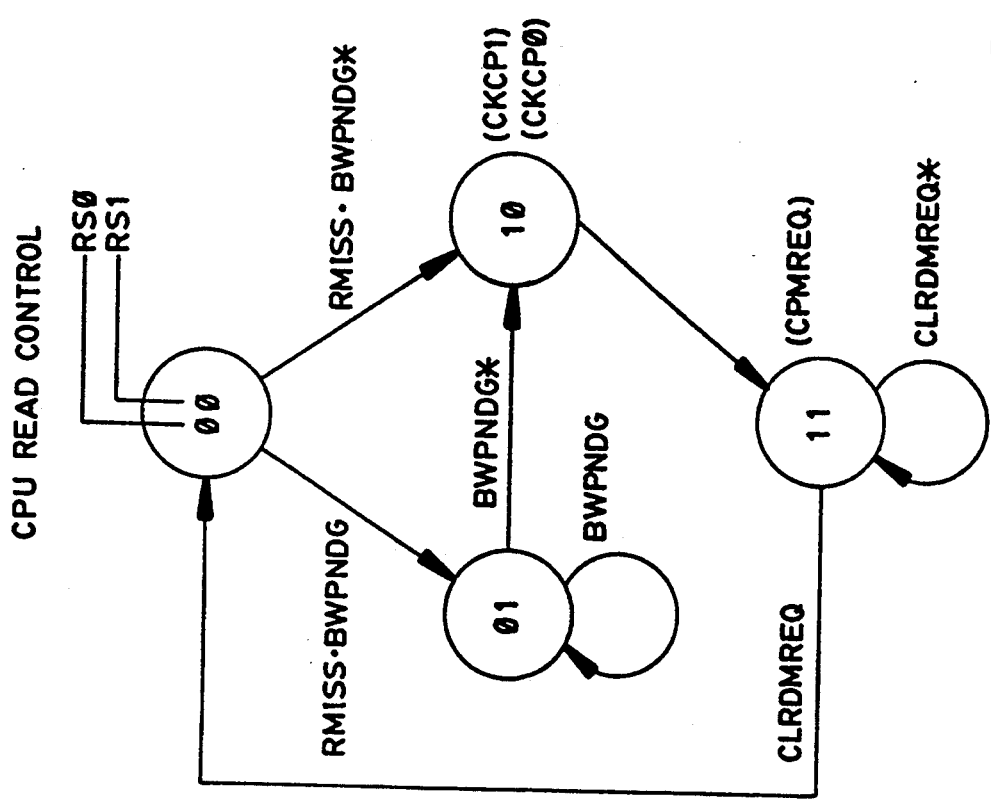

The state diagram of FIG. 12 depicts the operation of the MAU 36 for a CP memory read operation. When in State 00 a CP read occurs with a CACHE miss (RMISS) and either a buffered write pending (BWPNDG) or not pending (BWPNDG*). For the former case State 01 is entered until there is no buffered write pending (State 000 of FIG. 11), at which time State 10 is entered. State 10 is entered directly from State 00 if there is no buffered write pending. In State 10 the read address is clocked into both CP ADDR REG0 74 and CP ADDR REG1 76, and State 11 is entered where a CP memory request is asserted (CPMREQ). It is noted that the CP read address need not be clocked into both address buffer registers. The state machine remains in State 11 until the CP memory request is completed (CLRDMREQ), at which time State 00 is reentered. At this time the requested data has been returned by the MDUs 38a and 38b.

In summary, the CP 12 write buffer includes a pair of 64-bit memory input data registers and associated mark bit registers (located in the MDUs 38a and 38b), the two 24-bit memory address registers (74, 76), and the 24-bit previous address register (78). These registers, in conjunction with associated control logic, are used to buffer CP 12 write addresses and data to main memory 40. A purpose of the CP write buffer is to minimize the number of memory writes and CP stalls due to a memory busy condition. All CP 12 writes are loaded into one data/address register pair on the trailing edge of a CP write cycle and, if no other CP write requests are pending, one is requested. If a Write request is pending, the other data/address register pair is used. If both register pairs have a pending write, the last loaded register is checked for a match on the current write address using the previous address register, and a match of these registers results in the combination of the most recent pending write and the current write into one pending write, using the write merge circuitry of the MDUs 38a and 38b. The previous address register 78 is loaded when either of the other register pairs are loaded.

By detecting write matches, many CP 12 write operations can be eliminated during, for example, loop-type operations where several writes occur within a small range of main memory 40 addresses. The result is significant reduction in CP 12 generated memory activity, and a corresponding reduction in CP 12 write stalls.

The MAU 36 also includes an Address Register clock enable block 82 that receives two IO clock signals (CKIO) 82d and which outputs clocks 82a, 82b, and 82c to a first IO Address Register (IO ADDR REG0) 84, a second IO Address Register (IO ADDR REG1) 86, and an IO Previous Address Register 88, respectively. The IO address circuitry further includes an input IO Address Register 1 (IIO ADDR REG1) 90 that latches the input IO address as commanded by a R/A signal that is generated by the BIC 30. If an IO read operation is in progress (IORD low) then bit 28 of the IO address is forced to a zero by multiplexer 92, thereby forcing the IO read memory address to be quad-word aligned.

Figure 13:
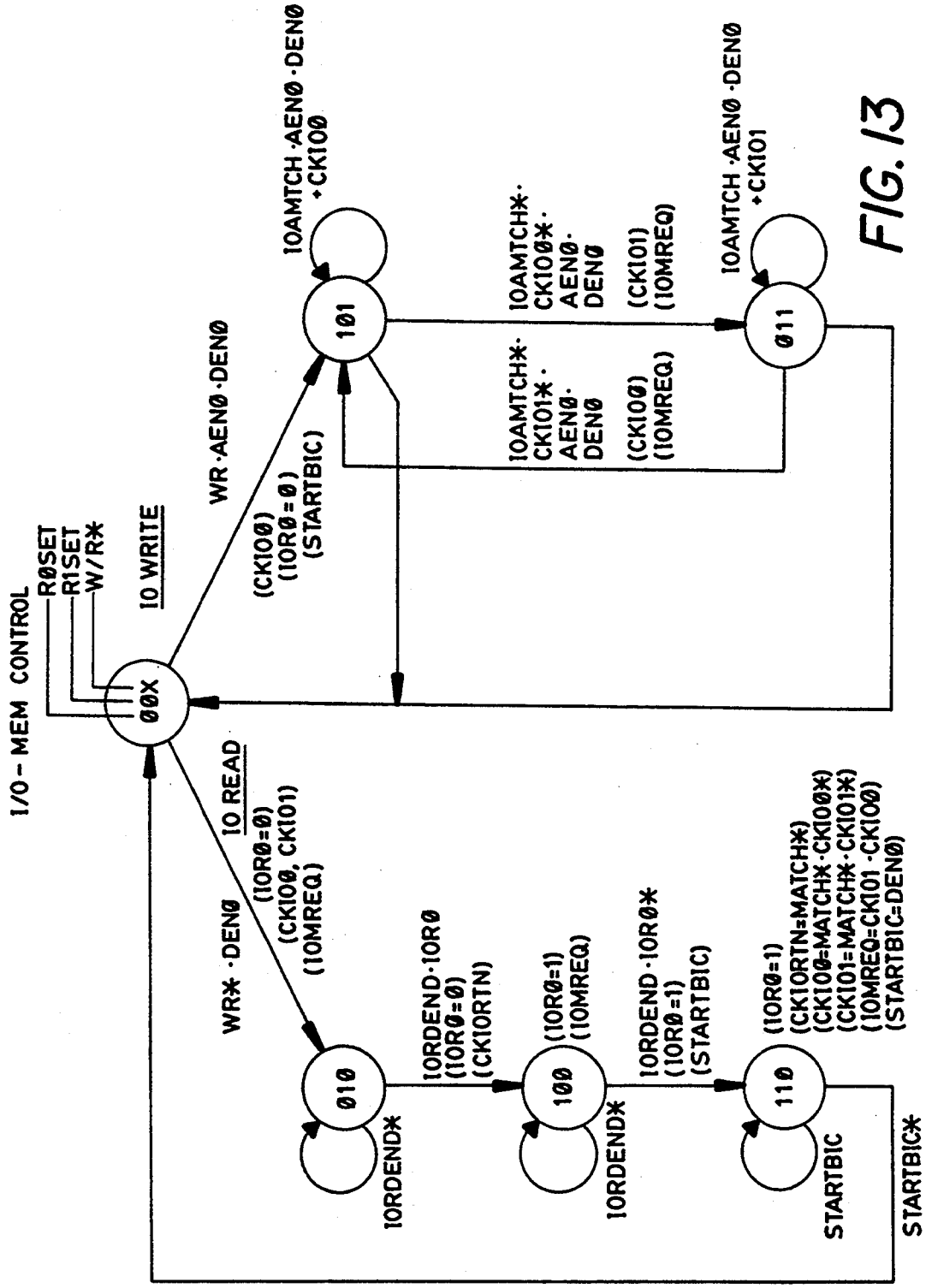

Referring to the IO memory control state diagram of FIG. 13 (the left branch), when an IO read operation is initiated an IO Register Zero flag is initialized to zero (IOR0=0), the IO ADDR REG0 84 and the IO REG1 86 are both clocked (CKIO0, CKIO1), as is the IO PREV ADDR REG 88, and an IO memory request (IOMREQ) is issued for the address contained within the IO ADDR REG0 84. The state IOR0 determines the source of the address applied to the memory (IOR0=0 then IO ADDR REG0 84, IOR0=1 then IO ADDR REG1 86). It is noted that the IO ADDR REG1 86 is loaded with the next quad-word aligned IO read address that is incremented by the adder 94, whereas IO ADDR REG0 84 loads the quad-word aligned IO read address. State 010 is then entered, and the state machine remains in State 010 until the first IO read ends (IORDEND). The conditions IORDEND and IOR0 being true cause a transition to state 100, with the IOR0 flag being reinitialized to zero (IOR0=0) and a clock IO return (CKIORTN) signal being asserted. The assertion of CKIORTN causes the quad-word of data that has been read from main memory 40 to be transferred from IO read memory data registers 190 and 192 (FIG. 6D) and latched into a 128-bit register (quad-word) in the MDUs 38a and 38b (registers 194, 196 of FIG. 6D). In State 100 the IOR0 flag is deasserted (set to a one) and a second IOMREQ is generated, this time for the previously incremented content of IO ADDR REG1 86. The state machine remains in State 100 until the IO read ends, at which time a transition is made to State 110. During the transition IOR1 is set to one, and a signal (STARTBIC) is issued to the BIC 30 (FIG. 2D) to begin the transfer of data read from main memory 40 to the bus 32. The state machine remains in State 110 for as long as the BIC 30 is issuing IO read addresses and transferring data to the bus 32.

While in State 110 the IO memory control state machine performs the following operations:

(a) CKIORTN is asserted whenever the IOAMTCH signal 96a indicates that an IO address being received does not equal the IO address stored in the IO PREV ADDR REG 88, thereby staging a quad-word of data to be output from the MDUs 38a and 38b;

(b) both CKIO0 and CKIO1 are asserted whenever the IOAMTCH signal 96a indicates that an IO address being received does not equal the IO address stored in the IO PREV ADDR REG 88, thereby loading the quad-word aligned read address into IO ADDR REG0 84 and the incremented quad-word aligned read address into IO ADDR REG 186, while also reloading the IO PREV ADDR REG 88; and (c) an IO memory request (IOMREQ) is generated whenever CKIO0 and CKIO1 are generated, thereby pre-fetching into registers 190 and 192 of the MDU 38 the next quad-word of data that is pointed at by the just-updated content of IO ADDR REG1 86.

As was noted above, each generated IO memory request, except the first request generated when transitioning to State 010, uses the incremented address stored in IO ADDR REG1 86. As a result, and in that IO read requests typically read a block of data from contiguous memory locations, the MAU 36 operates to pre-fetch a next quad-word aligned block of 16 data bytes into the MDUs 38a and 38b whenever the BIC 30 provides an IO address that does not match the IO address stored in the IO PREV ADDR REG 88.

Figure 6A:
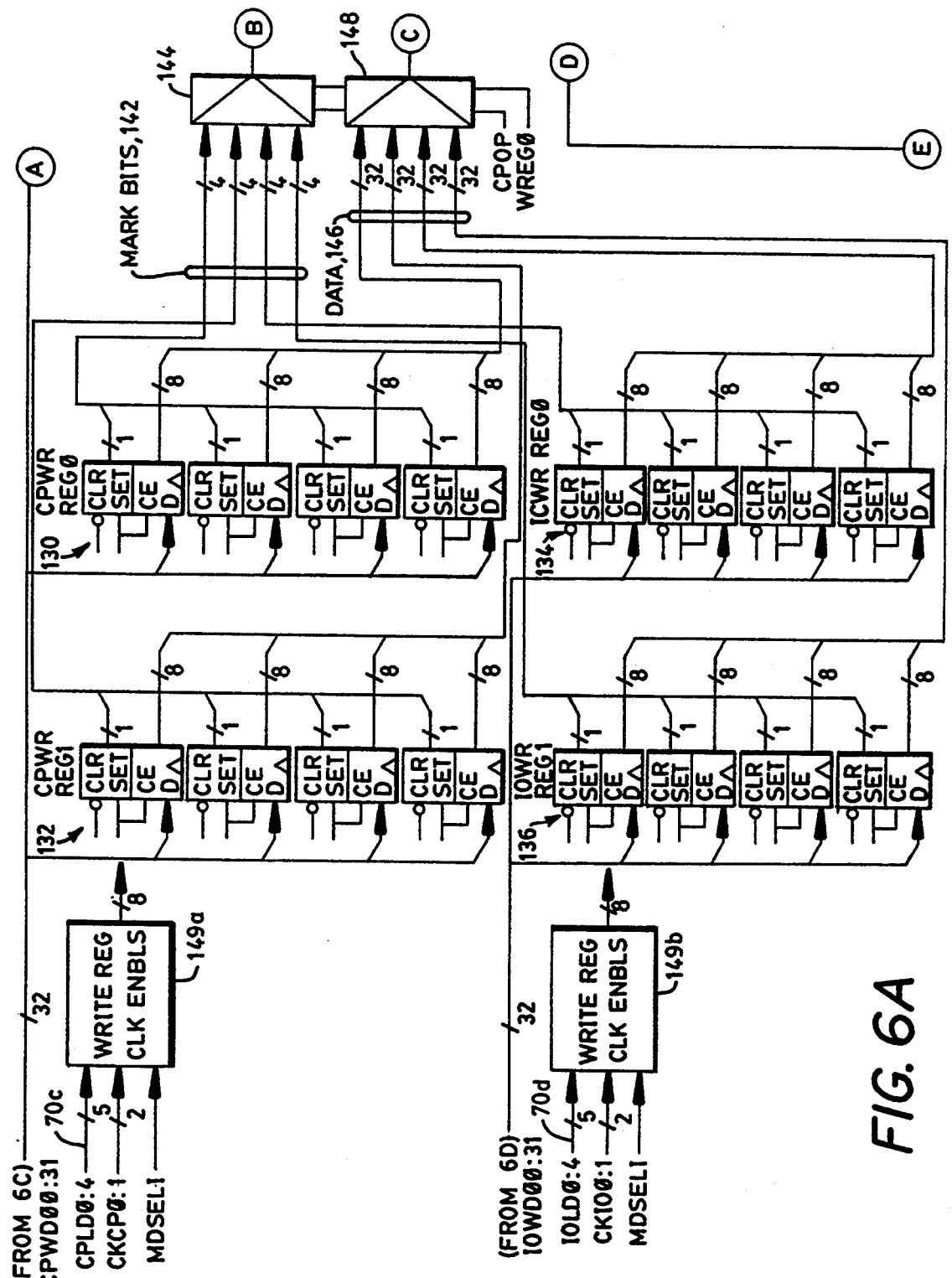
FIGS. 6A–6D are each a portion of a block of a Memory Data Unit (MDU) that is a component of the block diagram of FIGS. 2A–2D, two of which are specifically illustrated in FIG. 2C.
Figure 6B:
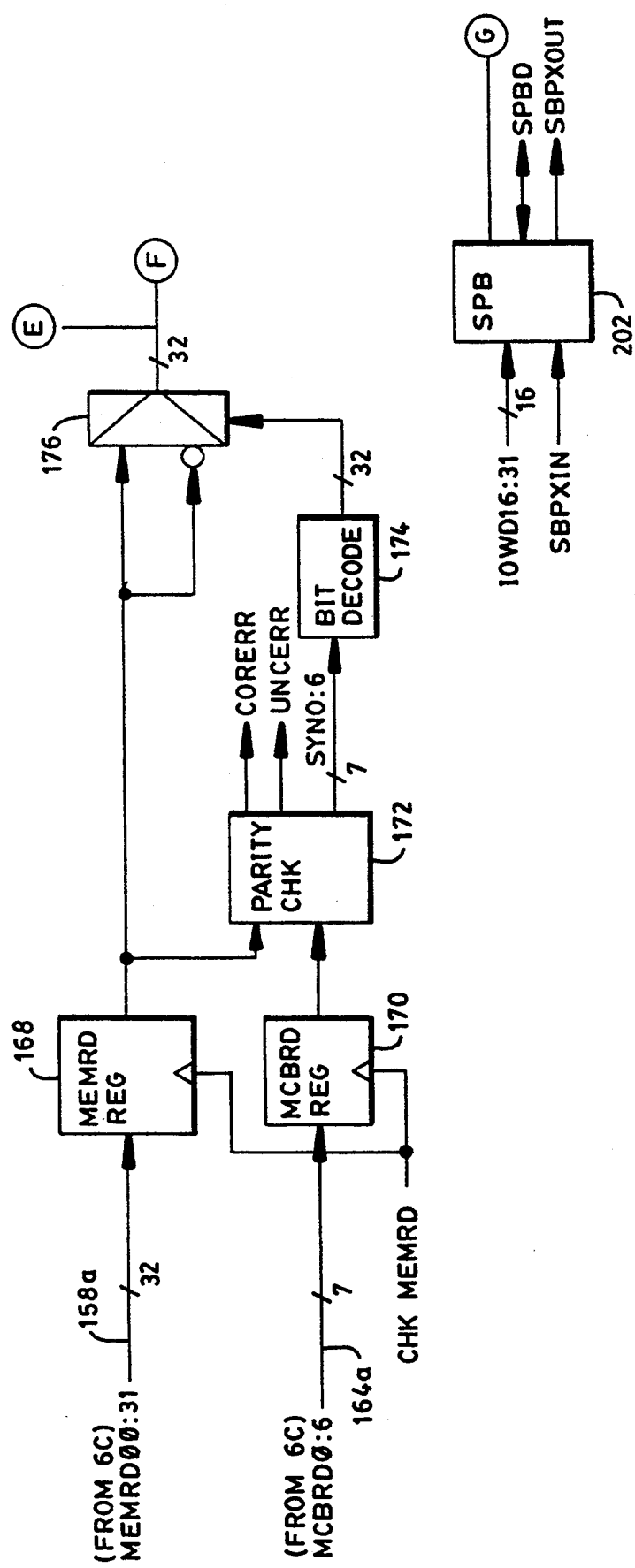
Figure 6C:
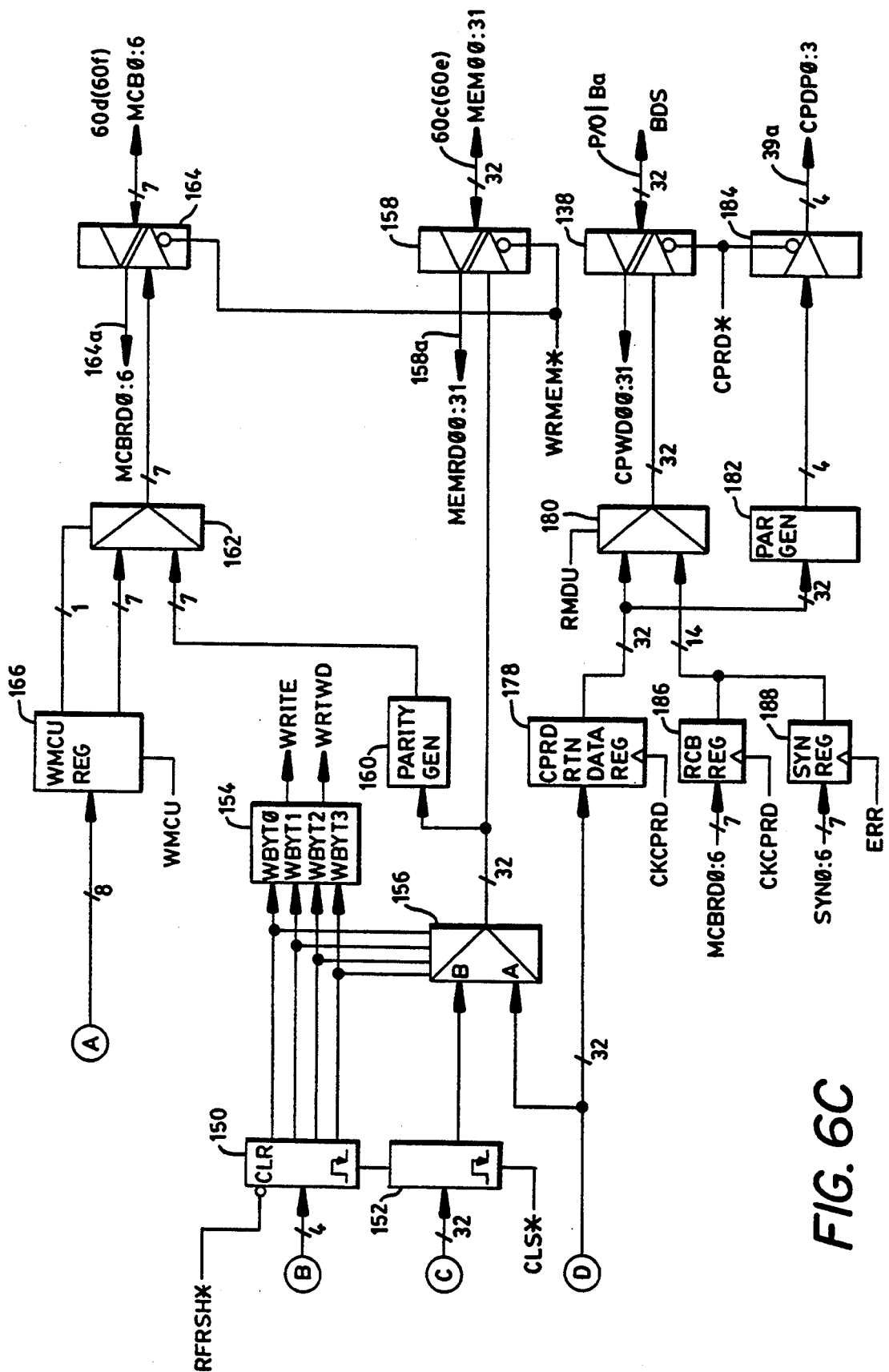
Figure 6D:
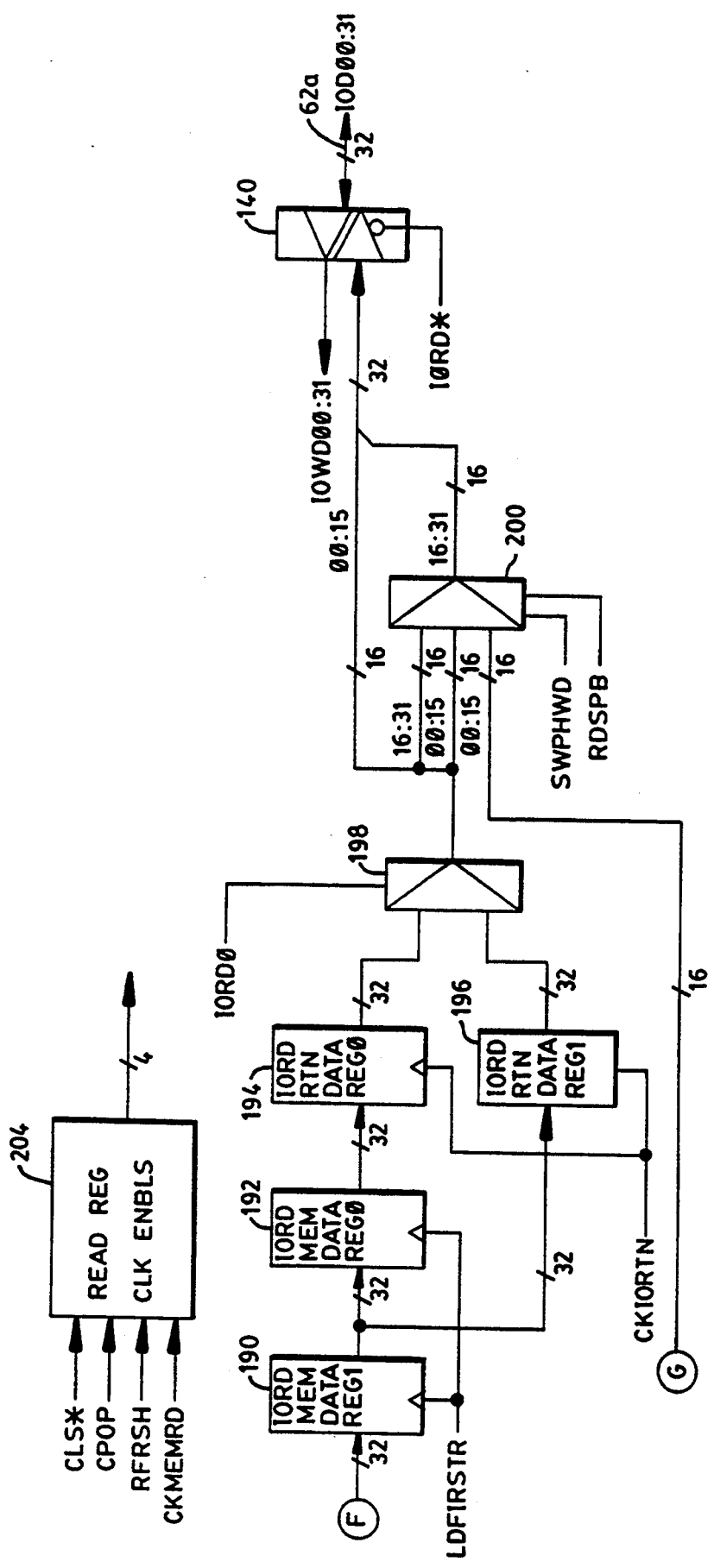
Figure 8:
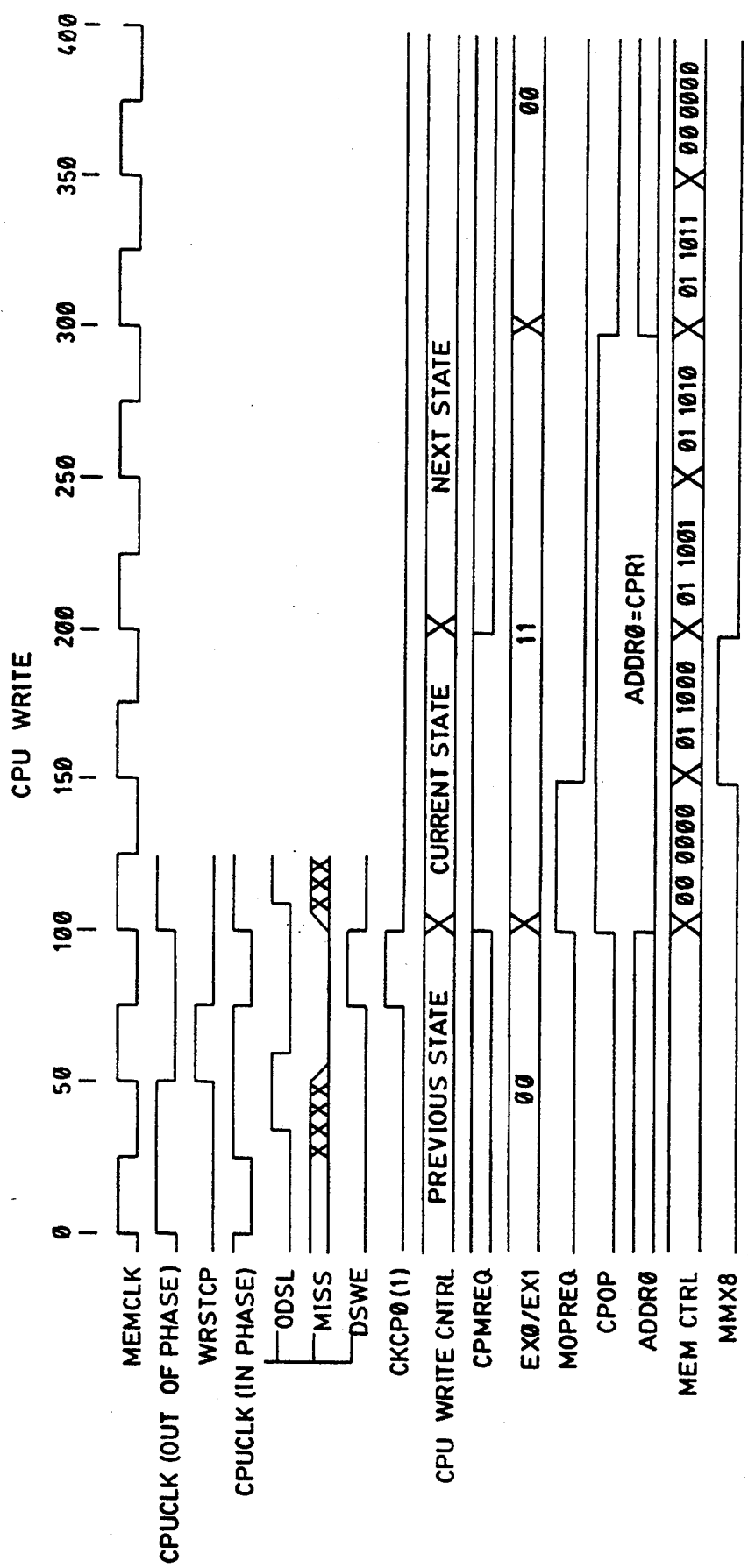
Figure 9:
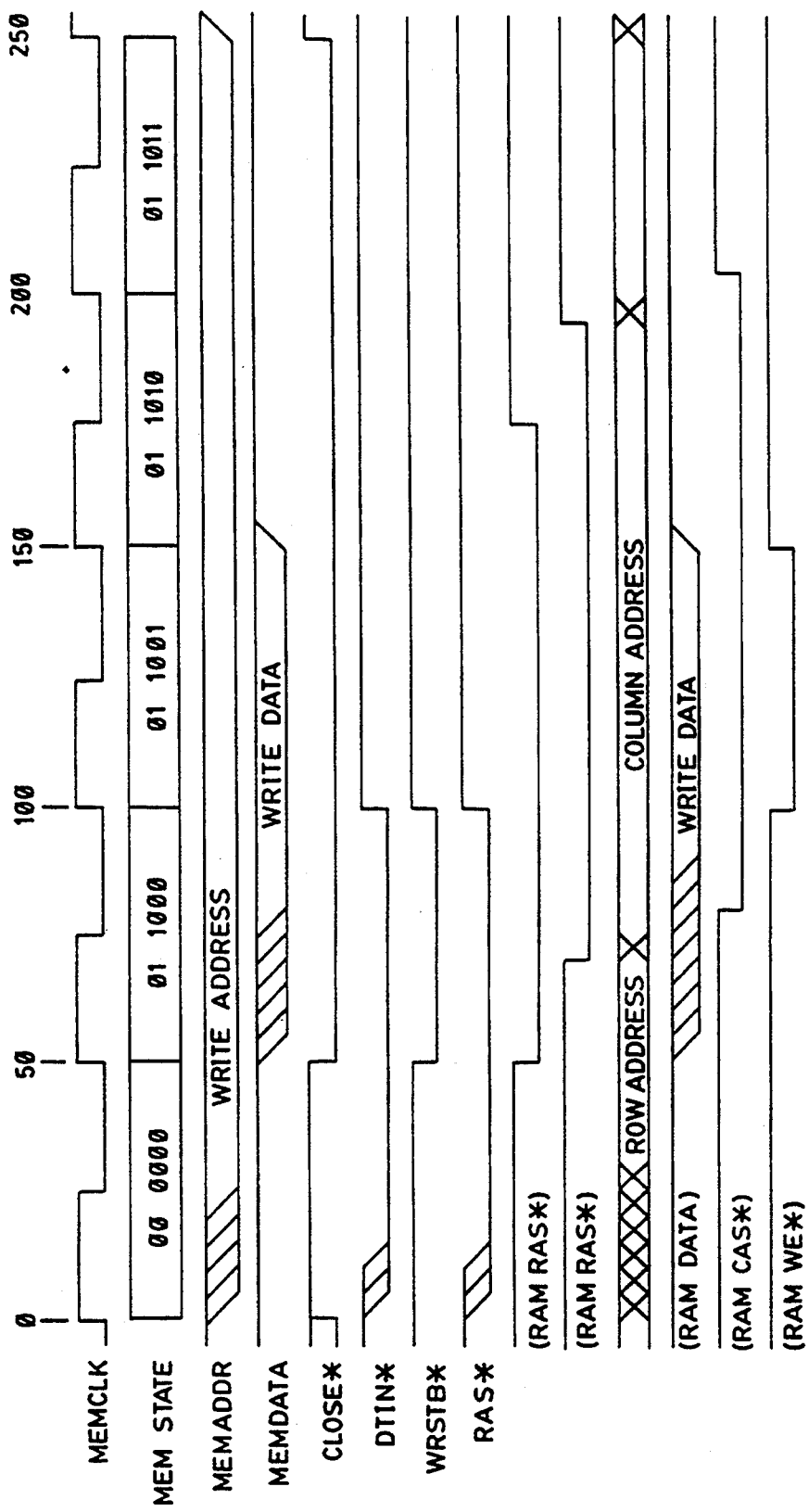
Figure 10:
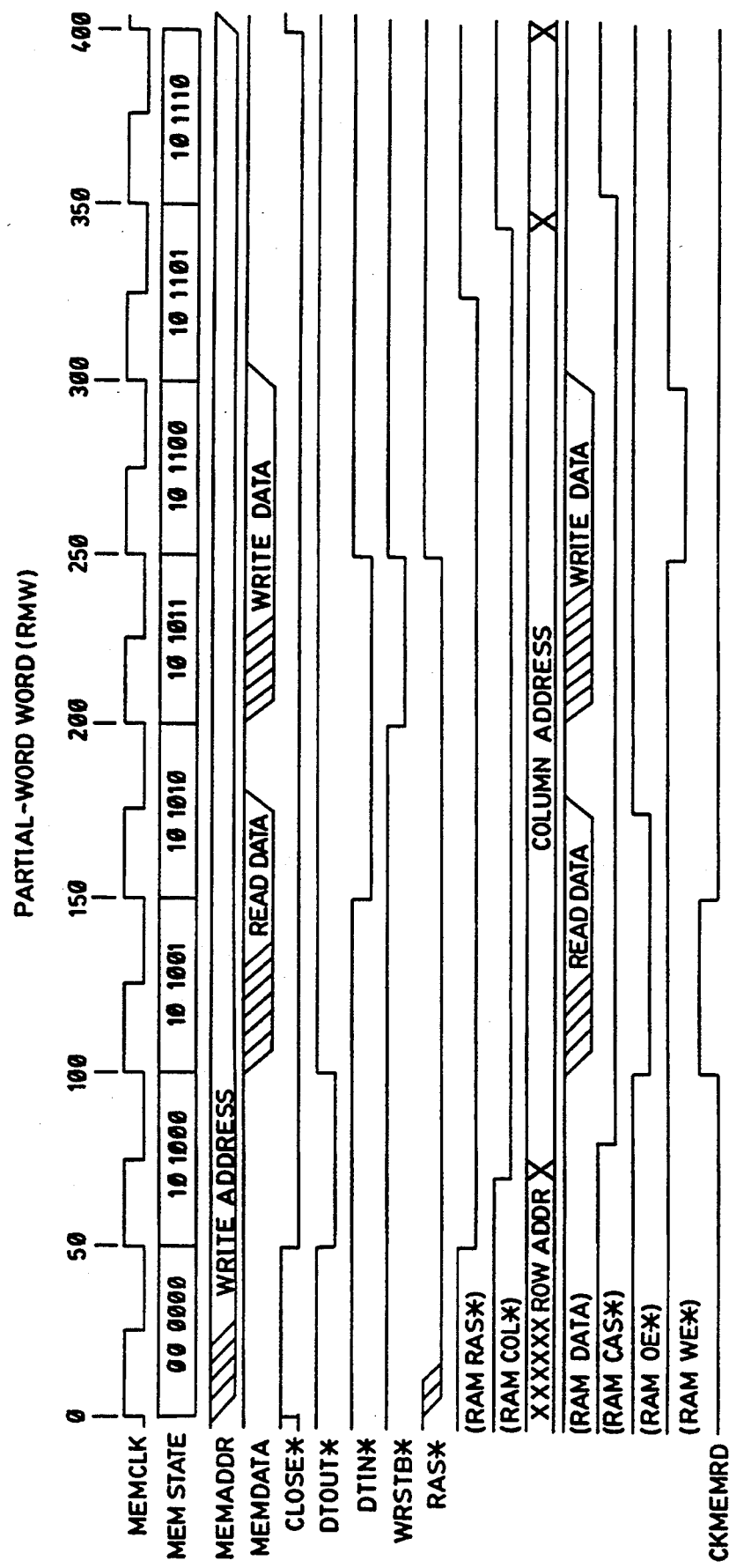

For example, the BIC 30 may be reading and transferring bytes, half-words, or words of data from the main memory 40 to an IO device coupled to the bus 32. As such, the BIC 30 may issue up to 16 read requests (assuming byte-wide transfers) for a given quad-word, before issuing a read request that causes the IOAMTCH signal 96a to go false. For each of these read requests, in that the IOAMTCH signal 96a remains true, the requested data is provided from the IO read return data registers 194 and 196 (FIG. 6D) of the MDUs 38, while a previously prefetched quad-word is already stored within IO read memory data registers 190 and 192 (FIG. 6D). When the IOAMTCH signal goes false, indicating that the BIC 30 is requesting a read from a next quad-word, the contents of the IO read memory data registers 190 and 192 within the MDUs 38 are transferred to the IO read return data registers 194 and 196, by the assertion of CKIORTN in State 110, and the BIC read request is then fulfilled. At the same time an IO memory request (IOMREQ) is issued, using the incremented quad-word aligned address in IO ADDR REG1 86, to pre-fetch a next quad-word into the IO read memory data registers 190 and 192 of the MDUs 38. As a result of this operation, the IO read data buffer circuitry stays one quad-word ahead of a current IO read operation being controlled by the BIC 30, and the number of main memory accesses is reduced.

For IO write operations the multiplexer 92 and adder 94 are not used. Instead, the circuitry operates in a similar fashion to the CP circuitry (registers 74, 76, 78 and comparator 80) as described previously.

As is seen the right branch of the state diagram of FIG. 13, in response to an IO write operation the IO write address is latched into IO ADDR REG0 94 (CKIO0) and the BIC 30 is started. In that IORD is not asserted, the multiplexer 92 does not operate to quad-word align the write address. As a result the address stored in IO ADDR REG0 84 and also in the IO PREV ADDR REG 88 is not quad-word aligned, but instead represents a double word (LSB bits 29, 30 and 31 are not registered). For every subsequent IO write that is within the same double word (IOAMTCH true), the IO ADDR REG0 84 is clocked, as is the IO PREV ADDR REG 88. This results in the IO write data being accumulated within the MDUs 38a and 38b, as specified by the five IOLD bits that are generated by the CP/IO write register control block 70 for each IO write operation.

On the occurrence of IOAMTCH going false, indicating that the BIC 30 has incremented the IO write address beyond the double word address stored in the IO PREV ADDR REG 88, CKIO1 is generated to latch the current IO write address (as does the IO PREV ADDR REG 88), and a memory request is issued (IOMEMRQ) to write the accumulated data from the MDUs 38 into main memory 40. State 011 is then entered.

For every subsequent IO write that is within the same double word (IOAMTCH true), IO ADDR REG1 86 is clocked, as is the IO PREV ADDR REG 88. This again results in the IO write data being accumulated within the MDUs 38a and 38b. On the occurrence of IOAMTCH going false, indicating that the BIC 30 has incremented the IO write address beyond the double word address stored in the IO PREV ADDR REG 88, CKIO0 is generated to latch the current IO write address into IO ADDR REG0 84 (and also into the IO PREV ADDR REG 88), and a memory request is issued (IOMEMRQ). State 101 is then entered.

The state machine alternates between states 101 and 011 until the STARTBIC signal goes false, indicating an end of the IO write sequence, at which time control returns to State 00X.

As was indicated above, the specifics of the MDU 38 operations in accumulating write data, before the data is actually written to main memory 40, are described below.

In summary, the IO Bus to Memory Interface includes the two 24-bit memory IO address registers 84 and 86, the 24-bit previous IO address register 88, the address comparator 96, two 64-bit memory write buffers with associated mark bit registers (located within the MDUs), and the memory read data FIFO (also located within the MDUs). The IO interface provides an efficient, high speed buffering mechanism that accommodates several types of IO DMA transfers with a small amount of control logic, while retaining a sufficient amount of residual memory bandwidth for CP 12 and refresh accesses. The IO interface operates in one of two modes, IO write transfers to main memory 40 and IO read transfers from main memory 40. During IO to memory transfers each IO write causes the IO PREV ADDR REG 88 and one of the memory address registers (84 or 86) to be loaded with the memory write address, along with appropriate data and modified flag(s) being loaded within the MDUs 38a and 38b. Subsequent writes load the same registers if the comparator 96 indicates an address match. If no match is indicated, a memory request is generated and the other register are used. Read operations are performed by first loading the MDU read data registers with 256-bits of read data from memory locations specified by the quad-word aligned address in IO ADDR REG0 84, followed by the incremented quad-word aligned address in IO ADDR REG1 86. The transfer is then begun (STARTBIC) and all incoming IO read addresses are checked for a current quad-word compare. If an incoming IO read address is not equal to the content of the IO PREV ADDR REG 88, a memory read request is generated, and the MDU read data registers are advanced. A significant feature of this aspect of the invention is that no specific addresses are used, and a knowledge of a transfer width (byte, word, etc.) is not required to determine memory operation types. That is, so long as an incoming IO read address is within a quad-word of the quad-word aligned address stored in the IO PREV ADDR REG 88, the requested data is supplied to the IO sub-system for transfer to a requesting agent, such as a disk or communication port.

Having described the address processing for CP 12 and IO operations, the remainder of the MAU 36 will now be described. Adders used as comparators 98 and 100 operate, in conjunction with a Decode Memory Configuration logic block 102, to detect the presence of an illegal CP-generated memory address (CPIMA) and an illegal IO-generated memory address (IOIMA), respectively. In the presently preferred embodiment of the invention the main memory 40 is implemented with Single In-line Memory (SIM) circuit packages which output 6-bits of status information on PDX0:5. The Decode Logic Block 102 is responsive to five bits of the PDX bus to output five bits, indicating a highest memory address, to the comparators 98 and 100, which also receive five MSBs of the CP address bus 34a and five MSBs of the IO address bus 36a, respectively. The presence of an illegal address condition is used to generate a program exception.

Refresh operations for the main memory 40 are accomplished with a Refresh Address Counter 104 which outputs a 24-bit refresh address and a Refresh Timer 106 which outputs a Refresh Request every 15.6 microseconds. A refresh grant signal (RFRSH) is applied as one selection input, in combination with signals CPOP and ADDR0, to an address multiplexer 108. The address multiplexer 108 selects an output address from one of five address sources: the Refresh Address Counter 104, the CP ADDR REG0 74, the CP ADDR REG1 76, the IO ADDR REG0 84, and the IO ADDR REG1 86. The selected memory address is latched in a Memory Address Latch 110, as is the RFRSH signal if present. Bits 05:08 of the latched address 110a are applied to a RAS/CAS Enable logic block 112, in conjunction with five SIM status bits and the latched RFRSH signal. Block 112 generates and outputs appropriate ones of four Enable RAS signals (ENARAS) and four Enable CAS signals (ENACAS). Bits 7:27 of the latched memory address 110a are applied to one input of an output memory address multiplexer 114. A second input (bit 28) of the output address multiplexer 114 is provided from an adder 116 which provides an incremented signal for any memory quad-word read (CP or IO). The output of the multiplexer 114 is the MA07:28 bus that is applied to the RAS/CAS multiplexer 46 of FIG. 2C. Bits 05:27, and the selectively incremented bit 28, of the latched memory address 110 are also applied as one input of an update multiplexer 118 which supplies the 24-bit update address bus (UPDT05:28) to the XMAR register 50 (FIG. 2A) and thus to the Tag Stores 56, 58 and, via multiplexer 20, to the address input of the CACHE 16. The second input of the update multiplexer 118 is provided, via External Memory Address Register (XMA REG) 120, from bits 05:28 of the IOADR bus 36a. Single input multiplexer 122 functions as a buffer for the update address. Bits 5:31 of the IOADR 36a are also applied to an adder 124 in combination with an output of a logic block 126. Logic block 126 is responsive to a 3-bit IO Command (IOCMD) 126a to generate a signal which is added to the IOADR bits 36a. If a carry occurs a Set Continuation Error (STCNU) signal is generated. The STCNU is used in a manner similar to the CPIMA and IOIMA signals, and is employed to generate an exception to the BIC 30. The exception in this case indicates that an illegal IO address has been generated.

Reference is now made to FIGS. 6A-6D for a description of the MDUs 38a and 38b. The MDUs 38a and 38b are substantially identical to one another in construction and operation and, as a result, the ensuing description will generally refer to both devices as the MDU 38.

Briefly, the MDU 38 provides a 64-bit data path for the CP 12 and two paralleled 32-bit data paths for the IO subsystem, with the 64-bit data CP 12 data path being evenly divided between the MDU 38a and the MDU 38b. The MDU 38 also provides, for each byte (8-bits) of the 64-bit and 32-bit data paths, storage for a Modified or Mark bit which, when set, indicates to the logic that the associated (modified or marked) byte is to be written to memory. Each data path (CP and IO) is double-buffered both for data and the associated Mark bits, with one buffer being associated with CP or IO ADDR REG0 of the MAU 36, while the other buffer is associated with CP or IO ADDR REG1 of the MAU 36. Logic is provided for selectively merging, into data read from main memory, those buffered bytes having a Mark bit that is asserted. The merging operation is accomplished as a read-modify-write (RMW) atomic memory operation. The MDUs 38a and 38b, in combination, also provide the quad-word FIFO (registers 190-196) that was referred to above in the description of the MAU 36 for IO read operations. Logic is provided for testing parity bits associated with data read from main memory 40, for correcting single bit errors, for providing indications of both correctable and uncorrectable errors, for setting error correction code (ECC) bits for data written into main memory, and for setting parity bits for data returned to the CACHE 16.

In greater detail, the MDU 38 includes, for the CP 12 data path, a first 32-bit input data register (CPWR REG0) 130 and a second 32-bit input data register (CPWR REG1) 132. For the IO data path, the MDU 38 includes a first 32-bit input data register (IOWR REG0)

134 and a second 32-bit input data register (IOWR REG1) 136. The 32-bit CP write data bus (CPWD) is sourced from one half of a transceiver 138 (FIG. 6C) that is coupled to 32-bits of the 64-bit Buffered Data Store Bus (BDSB) 18a. The BDSB 18a is connected, as previously described, to the CACHE 16 and the CDU 18 in FIG. 2B. The 32-bit IO write data bus (IOWD) is sourced from one half of an IO transceiver 140 (FIG. 6D) that is coupled to the 32-bit IO Data Bus 62a. A total of 16 Mark bits that are output from the registers 130-136 form a Mark bus 142 that is applied to a 4-way multiplexer 144. A Mark bit is set automatically when a byte to be written to main memory 40 is sourced by the CP 12 or the IO into the associated 8-bit portion of the registers 130-136. A total of 128 data bits output from the registers 130-136 form a data bus 146 that is applied to a 4-way multiplexer 148. Logic block 149a is responsive to the CPLD0:4 70c bus that is output from the MAU 36, to two CP clock signals (CKCP), and to a Mode Select (MDSEL) input to generate eight clock enables for controlling the operation of the total of eight byte-wide (plus Mark bit) CP registers 130 and 132. In similar fashion, logic block 149b is responsive to the IOLD0:4 70d bus that is output from the MAU 36, to two IO clock signals (IOCP), and to the Mode Select input to generate eight clock enables for controlling the operation of the total of eight byte-wide (plus Mark bit) IO registers 134 and 136. The MDSEL input has a first logic state for the MDU 38a and a second logic state for the MDU 38b, and is a function of which position on the printed circuit board that the MDU device is installed within.

In general, the logic blocks 149a and 149b cooperate with the MAU 36 to selectively accumulate within the registers 130-136 the data from a plurality of CP or IO writes. So long as write addresses (CP or IO) are within a given double word the associated write data is accumulated in the registers 130, 132 (CP writes) or 134, 136 (IO writes). Only when a write address is outside of a given double word is the content of the registers 130, 132 or 134, 136 written out to main memory 40, using the address buffered in the MAU 36, and as specified by the state of the associated Mark bits.

Multiplexers 144 and 148 are controlled by two signals (CPOP and WREGO) which define whether a CP or an IO memory operation is in process, and whether the corresponding REGO (130, 134) or REG1 (132, 136) is being used. The selected 4-bit output of the Mark multiplexer 144 is applied to a transparent latch 150, while the selected 32-bit output of the data multiplexer 148 is applied to a transparent latch 152. The latched Mark bits are input to a logic block 154 which decodes the bits to determine a type of main memory cycle to be performed (read, write, read/modify/write). The decoded indication is provided to the memory controller 31 in FIG. 2D.

The following two Tables show the significance of the Mark bits in generating the WRITE and WRTWD signals, and the interpretation by the memory controller 31 of the WRITE and WRTWD signals from the MDUs 38a and 38b. In the second table WRITE0 and WRITE1 refer to the WRITE signal generated by the MDU 38a and the MDU 38b, respectively. The same convention is employed for the WRTWD0 and WRTWD1 signals.

| MARK BITS | WRITE | WRTWD |
|---|---|---|
| 0000 | 0 | 0 |
| 1111 | 1 | 1 |
| any other | 1 | 0 |

| WRITE0 | WRTWD0 | WRITE1 | WRTWD1 | MEM OPERATION |
|---|---|---|---|---|
| 0 | 0 | 0 | 0 | READ |
| 1 | 0 | X | X | RMW |
| X | X | 1 | 0 | RMW |
| 1 | 1 | 0 | 0 | WRITE |
| 0 | 0 | 1 | 1 | WRITE |
| 1 | 1 | 1 | 1 | WRITE |

For either case (WRITE or WRTWD) the latched Mark bits are also applied as control inputs to a Merge Multiplexer (MERGEMUX) 156 which functions to selectively replace one to three bytes, for a partial word write operation, of a word read from memory (input A) with a corresponding latched byte or bytes from the latch 152. For a word write operation a RMW memory operation is not required and, as a result, all four latched bytes are driven through the MERGEMUX 156, with the input A being a "don't care". The output of the MERGEMUX 156 is subsequently driven through one half of a transceiver 158 to the memory data bus 60c or 60e, depending on whether the MDU is installed as the MDU 38a or the MDU 38b, respectively. In parallel, a parity generator 160 generates 7-bits of parity information over the 32-bit word output by the MERGEMUX 156. The parity information is driven through a multiplexer 162 and one half of a transceiver 164 to the memory parity bus 60d or 60f, depending on whether the MDU is installed as the MDU 38a or the MDU 38b, respectively. The second input to the multiplexer 162 is provided from a register 166 which is used for diagnostic purposes, and which provides a capability to force the parity bits to any desired state.

Having described the output (write) data path to the main memory 40, a description is now made of the input (read) data path from the main memory 40. Transceivers 158 and 164 source an internal 32-bit Memory Read (MEMRD) bus 158a and a 7-bit parity (MCBRD) bus 164a, respectively, to a Memory Read Register (MEMRD REG) 168 and MCBRD REG 170, respectively. A Parity Checker 172 is connected to the output of the MCBRD REG 170 and to the output of the MEMRD REG 168 to provide signals that indicate an occurrence of a correctable error or an uncorrectable error in the data read from the main memory 40. The Parity Checker 172 also outputs seven syndrome bits to a bit decoder 174 having a 32-bit output that is applied as control signals to a correction multiplexer 176. Correction multiplexer 176 includes 32, two input multiplexers each of which receives one bit of the registered memory read bus and the inversion of that bit. Depending on the state of the associated bit from the bit decoder 174, the true or the inverse of each bit is selected, thereby providing a mechanism to selectively correct an erroneous bit error in the 32-bit data word read from the main memory 40. The output of the correction multiplexer 176 forms a corrected read data bus that is input to the above-described MERGEMUX 156 for CP 12 and IO write operations, and also to a CP Read Return Data Register 178 for coupling, during a CP Read (CPRD*) operation, to the CACHE 16 and CDU 18 via a multiplexer 180, the transceiver 138, and one half of the BDS bus 18a. A parity generator 182 generates 4-bits of parity over the 32-bits of corrected read data, and provides the parity information to one half of the CP Data Parity (CPDP) bus 39a, via an output driver 184.

Registers 186 and 188, in cooperation with multiplexer 180, provide a capability for the 7-bit MCBRD bus 164a and the 7-bits of syndrome information, generated by Parity Checker 172, to be placed on the BDS bus 18a. These circuits are used for diagnostic purposes.

The output of the correction multiplexer 176 that forms the corrected read data bus is also input to the first IO Read Memory Data Register (IO MEM DATA REG1) 190 and thence to the second IO Read Memory Data Register (IO MEM DATA REG0) 192. These two registers, in combination with the corresponding two registers in the second MDU, form a part of the above-described quad-word FIFO that is used during IO read operations. The 32-bit output of IO MEM DATA REG0 192 is input to the first IO Read Return Data Register (IORD RTN DATA REG0) 194, while the 32-bit output of IO MEM DATA REG1 190 is input to the second IO Read Return Data Register (IORD RTN DATA REG1) 196. Registers 194 and 196 are loaded by the assertion of the above-described CKIORTN signal. The registers 194 and 196, in combination with the corresponding two registers in the second MDU, form the above-mentioned quad-word IO data return register for use during IO read operations. A multiplexer 198 selectively outputs either the output of the IORD RTN DATA REG0 194, or the output of the IORD RTN DATA REG1 196, to the output half of the IO transceiver 140 and to a multiplexer 200. Multiplexer 200 is responsive to a Swap Half Word (SWPHWD) input signal to selectively re-order the two 16-bit half-words that are output from the multiplexer 198 before application to the output half of the IO transceiver 140. A further input to the multiplexer 200 is a 16-bit bus output by a Support Packet Bus (SPB) device 202. This 16-bit bus is used for diagnostic purposes, and is selected by a Read SPB (RDSPB) signal being true to the multiplexer 200. As with the other diagnostic functions and circuitry described previously, the operation of the SPB device 202 is not germane to an understanding of this invention, and is not described further.

A logic block designated as Read Register Clock Enables 204 is responsive to a plurality of inputs for generating the required register clocking signals for the registers involved in providing read data to the CP 12, via CACHE 16 and CDU 18.

During memory refresh operations the parity checker 172 is used to check the parity of a word read out of main memory 40. If a single bit error is found, the error is corrected in the correction multiplexer 176, and the corrected word is written out to main memory 40. This operation is facilitated by forcing the output of the Mark bit latch 150 to zero with the RFRSH* signal that is applied to the clear input, thereby selecting the A input of the MERGEMUX 156 for all four bytes of corrected read data. If an uncorrectable error is detected, the defective, uncorrectable word is not written back to the main memory 40. Using this technique, and assuming that the main memory 40 includes 128 Mbytes of storage and that a refresh cycle occurs approximately every 16 microseconds, the entire main memory 40 can be "scrubbed" in approximately 4.5 minutes.

In accordance with foregoing description it can be appreciated that an aspect of this invention is the provision of a memory operation queue that is comprised of the 64-bit memory data registers 130-136, with their associated modified or Mark bits, and the 24-bit memory address registers (74, 76, 84, 86 of the MAU 36). These register sets, in conjunction with associated control logic, are used to queue and execute memory operations. A basic operation of the memory queue is to hold memory operations from the CP 12, the IO subsystem, and the Refresh Timer 106, and to execute these operations according to their relative levels of priority. When a memory request is received the arbitration circuit of the memory controller 31, which operates in accordance with the state diagram of FIG. 15, determines which pending operation has the highest priority request, and the appropriate staging of the logic is performed. When available, the memory controller 31 opens then closes the current memory latch and initiates the memory operation by asserting the RAS signal. FIGS. 7-10 depict the timing of various main memory operations, while FIG. 14 illustrates the DRAM control state machine that also forms a portion of the memory controller 31. In parallel, the memory controller 31 interrogates the Mark bits, as reflected in the WRITE and WRTWS signals output from decoder 154, and determines the type of memory operation (RMW, READ, WRITE).

In accordance with this aspect of the invention, no dedicated memory commands are stored in the queue. Instead, all command information is determined from the Mark bits. That is, if no Mark bits are set, the memory operation is a read. If any, but not all Mark bits are set in either word (MDU 38a or MDU 38b), the memory operation is a RMW, with the bytes to be modified specified by the Mark bits that are set. If all Mark bits are set, in one or both words, the memory operation is a write operation (not a RMW). If a refresh operation is selected, the Mark bits are forced to an un-marked condition, and the memory operation is selected to be a read with a conditional write-back for error scrubbing.

It can be appreciated that the above-described operation of the MAU 36 and the MDUs 38a and 38b provides a functionality that is similar in some respects to that of a write-back cache, without incurring the circuit complexity that is typically associated with a write-back cache.

While the invention has been particularly shown and described with respect to a preferred embodiment thereof, it will be understood by those skilled in the art that changes in form and details may be made therein without departing from the scope and spirit of the invention.

What is claimed is:

1. A data processing system having a central processor (CP), a memory, an address bus coupled to said CP having signal lines for conveying memory addresses that are generated by said CP, and a data bus coupled to said CP for transferring data to and from said CP for memory read and memory write operations, respectively, said system further comprising:

address buffer means connected within said address bus between said CP and said memory for receiving and buffering memory addresses that are generated by said CP, said address buffer means comprising, a plurality of registers each having a width sufficient for storing a first portion of a memory address received from said CP during a CP write to memory operation, said plurality of registers including a first address register for storing a first portion of a first memory address received from said CP, and a second address register for storing said first portion of said first memory address received from said CP, said stored first portion of said first memory address being a content of said second address register; and comparator means having a first input that is coupled to an output of said second address register and a second input that is coupled to said address bus, for comparing said first portion of a second memory address that is received from said CP to said content of said second address register, said comparator means having an output for indicating, when in a first state, that (a) said first portion of said second memory address that is received from said CP is equal to said content of said second address register, and that (b) a write to memory operation for which said second memory address is generated can be combined with a write to memory operation for which said first memory address was generated;

wherein said address buffer means further comprises a third address register for storing said first portion of said second memory address received from said CP, said third address register storing said first portion of said second memory address only when said output of said comparator means has a second state for indicating that said first portion of said second memory address that is received from said CP is not equal to said content of said second address register; said data processing system further comprising, data buffer means connected within said data bus between said CP and said memory for receiving and buffering CP write data corresponding to said memory addresses that are generated by said CP, said data buffer means comprising, a first data register for storing CP write data corresponding to said first portion of said address stored within said first address register, and a second data register for storing CP write data corresponding to said first portion of said address stored within said third address register;

wherein said first data register and said second data register each have a width of a plurality of bytes, and wherein said data buffer means further includes a first mark bit register for storing indications of which bytes of said first data register are written in to, and a second mark bit register for storing indications of which bytes of said second data register are written in to; and means, responsive to mark bit indications stored within said first and second mark bit registers, for selectively merging data from one of said first and second data registers with data read from a memory location that is specified by a corresponding one of said first and third address registers.

2. A data processing system as set forth in claim 1 and further comprising:

means, responsive to a second state of said output of said comparator means, for generating a memory request; and means, responsive to said generated memory request, for decoding said mark bit indications stored within one of said first and second mark bit registers and for controlling said memory in response to said decoded mark bit indications to selectively perform one of a memory read operation, a memory read-modify-write operation, and a memory write operation.

3. A data processing system having an Input/Output controller (IOC), a memory, an address bus coupled to said IOC having signal lines for conveying memory addresses that are generated by said IOC, and a data bus coupled to said IOC for transferring data to and from said IOC during memory read and write operations, respectively, said system further comprising;

address buffer means connected within said address bus between said IOC and said memory for buffering a plurality of memory addresses that are generated by said IOC, said address buffer means comprising, a plurality of registers each having a width sufficient for storing a first portion of a memory address received from said IOC during an IOC write to memory operation, said plurality of registers including a first register for storing a first portion of a first memory address received from said IOC, and a second register for storing said first portion of said first memory address received from said IOC, said stored first portion of said first memory address being a content of said second register; and comparator means having a first input that is coupled to an output of said second register and a second input that is coupled to said address bus, for comparing said first portion of a second memory address that is received from said IOC to said content of said second register, said comparator means having an output for indicating, when in a first state, that (a) said first portion of said second memory address that is received from said IOC is equal to said content of said second register, and that (b) a write to memory operation for which said second memory address is generated can be combined with a write to memory operation for which said first memory address was generated;

wherein said address buffer means further comprises a third register for storing said first portion of said second memory address received from said IOC, said third register storing said first portion of said second memory address only when said output of said comparator means has a second state for indicating that said first portion of said second memory address that is received from said IOC is not equal to said content of said second register; said data processing system further comprising, data buffer means connected within said data bus between said IOC and said memory for receiving and buffering IOC write data corresponding to said memory addresses that are generated by said IOC, said data buffer means comprising, a first data register for storing IOC write data corresponding to said first portion of address stored within said first address register, and a second data register for storing IOC write data corresponding to said first portion of said address stored within said third address register;

wherein said first data register and said second data register each have a width of a plurality of bytes, and wherein said data buffer means further includes a first mark bit register for storing indications of which bytes of said first data register are written in to, and a second mark bit register for storing indications of which bytes of said second data register are written in to; and means, responsive to mark bit indications stored within said first and second mark bit registers, for selectively merging data from one of said first and second data registers with data read from a memory location that is specified by a corresponding one of said first and third address registers.

4. A data processing system as set forth in claim 3 and further comprising:

means, responsive to a second state of said output of said comparator means, for generating a memory request; and means, responsive to said generated memory request, for decoding said mark bit indications stored within one of said first and second mark bit registers and for controlling said memory in response to said decoded mark bit indications to selectively perform one of a memory read operation, a memory read-modify-write operation, and a memory write operation.

5. A method for writing data to a main memory from a central processor (CP), comprising the steps of:

generating a first write request with said CP, said first write request including a generated address provided on an address bus and data provided on a data bus;

storing external to said CP a first portion of said address from said address bus in a first register and in a second register while decoding, external to said CP, said first write request to determine which bytes of a multi-byte data word are to be written to said main memory;

buffering external to said CP, in response to said decoded write request, selected bytes within a first data register and an indication of said selected bytes within a first mark bit register;

generating, external to said CP, a first memory request to perform a memory write operation at a location specified in part by said first portion of said address stored within said first register; and while waiting for a completion of said write operation that is performed in response to said first memory request, and further in response to a generation of a second write request by said CP, storing external to said CP said first portion of said address, from said address bus, that is generated for said second write request in a third register and in said second register while decoding, external to said CP, said second write request to determine which bytes of said multi-byte data word are to be written to said main memory;

buffering external to said CP, in response to said decoded second write request, selected bytes within a second data register and an indication of said selected bytes within a second mark bit register;

generating, external to said CP, a second memory request to perform a memory write operation at a location specified in part by said first portion of said address stored within said third register; and while waiting for a completion of said first memory request, and further in response to a generation of a third write request by said CP, comparing, external to said CP, said first portion of said address generated for said third write request with said first portion of said address stored in said second register, and, if said two first portions are found to be equal;

storing, external to said CP, said first portion of said address from said address bus in said third register and in said second register while decoding, external to said CP, said third write request to determine which bytes of said multi-byte data word are to be written to said main memory; and buffering external to said CP, in response to said decoded third write request, selected bytes within said second data register and an indication of said selected bytes within said second mark bit register.

6. A method as set forth in claim 5, wherein if said step of comparing said first portion of said address generated for said third write request with said first portion of said address stored in said second register indicates that said two first portions are not equal, said method includes a step of halting said CP third write request until said completion of said first memory request.

7. A method as set forth in claim 5 and further including the steps of:

performing said memory write operation for said first write request as a write operation or as read/modify/write operation of said data stored in said first data register in accordance with said mark bits stored in said first mark bit register; and performing said memory write operation for said second write request as a write operation or as read/modify/write operation of said data stored in said second data register in accordance with said mark bits stored in said second mark bit register.

8. A method as set forth in claim 5 wherein said first portion of a memory address has a number of bits specifying a minimum resolution of a double word of memory addresses, wherein a double word consists of eight bytes.

9. A method for writing data to a main memory from an Input/Output Controller (IOC), comprising the steps of:

generating a first write request with said IOC, said first write request including a generated address provided on an address bus and data provided on a data bus;

storing external to said IOC a first portion of said address from said address bus in a first register and in a second register while decoding, external to said IOC, said first write request to determine which bytes of a multi-byte data word are to be written to said main memory;

buffering external to said IOC, in response to said decoded write request, selected bytes within a first data register and an indication of said selected bytes within a first mark bit register;

in response to said generation of a second write request by said IOC, comparing, external to said IOC, said first portion of said address generated for said second write request with said first portion of said address stored in said second register, and, if said two first portions are found to be equal;

storing, external to said IOC, said first portion of said address from said address bus in said first register and in said second register while decoding, external to said IOC, said second write request to determine which bytes of said multi-byte data word are to be written to said main memory; and buffering, external to said IOC, in accordance with said decoded second write request, selected bytes within said first data register and an indication of said selected bytes within said first mark bit register;

if said step of comparing said first portion of said address generated for said second write request with said first portion of said address stored in said second register indicates that said two first portions are not equal, the method includes the further steps of:

generating, external to said IOC, a first memory request to perform a memory write operation at a location specified by said first portion of said address stored within said first register;

storing, external to said IOC, said first portion of said address from said address bus that is generated for said second write request in a third register and in said second register while decoding, external to said IOC, said second write request to determine which bytes of said multi-byte data word are to be written; and buffering external to said IOC, in response to said decoded second write request, selected bytes within a second data register and an indication of said selected bytes within a second mark bit register;

in response to said generation of a third write request by said IOC, comparing, external to said IOC, said first portion of said address generated for said third write request with said first portion of said address stored in said second register, and, if said two first portions are equal;

storing, external to said IOC, said first portion of said address from said address bus in said third register and in said second register while decoding, external to said IOC, said third write request to determine which bytes of said multi-byte data word are to be written; and buffering external to said IOC, in response to said decoded third write request, selected bytes within said second data register and an indication of said selected bytes within said second mark bit register.

10. A method as set forth in claim 9, wherein if said step of comparing said first portion of said address generated for said third write request with said first portion of said address stored in said second register indicates that said two first portions are not equal, the method includes the steps of:

storing, external to said IOC, said first portion of said address from said address bus in said first register and in said second register while decoding, external to said IOC, said third write request to determine which bytes of said multi-byte data word are to be written;

buffering external to said IOC, in response to said decoded write request, selected bytes within said first data register and an indication of said selected bytes within said first mark bit register; and generating a second memory request to perform a memory write operation at a location specified by said first portion of said address stored within said third register.

11. A method as set forth in claim 10 and further including the steps of:

performing said memory write operation for said first write request as a write operation or as read-/modify/write operation of said data stored in said first data register in accordance with said mark bits stored in said first mark bit register; and performing said memory write operation for said second write request as a write operation or as read/modify/write operation of said data stored in said second data register in accordance with said mark bits stored in said second mark bit register.

12. A method as set forth in claim 9 wherein said first portion of a memory address has a number of bits specifying a minimum resolution of a double word of memory addresses, wherein a double word consists of eight bytes.

13. A method for reading data from a main memory with an Input/Output Controller (IOC), comprising the steps of:

(a) generating a first read request with said IOC, said first read request including an address provided on an address bus;

(b) receiving, external to said IOC, said address from said address bus and aligning said received address so as to be on a main memory address boundary;

(c) storing, external to said IOC, said aligned address in a first register and in a second register;

(d) incrementing, external to said IOC, said aligned address to a next memory boundary and storing, external to said IOC, said incremented aligned address in a third register;

(e) generating, external to said IOC, a first memory request to perform a memory read operation at a location specified by said aligned address stored within said first register;

(f) at a completion of said memory read operation performed by said first memory request, buffering, external to said IOC, said read data in a first data register;

(g) generating, external to said IOC, a memory request to perform a memory read operation at a location specified by said incremented aligned address stored within said third register;

(h) at a completion of said memory read operation performed by said second memory request, buffering, external to said IOC, said read data in a second data register;

(i) generating a next read request with said IOC, said next read request including an address provided on said address bus;

(j) receiving, external to said IOC, said address from said address bus and aligning said received address to be on a next main memory address boundary;

(k) comparing, external to said IOC, said aligned address generated for said second read request with said aligned address stored in said second register, and, if said two aligned addresses are equal;

(l) returning data from said first data register to said IOC; else, if said two aligned addresses are not equal, (m) transferring said data stored within said second data register to said first data register;

(n) returning data from said first data register to said IOC;

(n) incrementing, external to said IOC, said aligned address generated for said next read request to a next memory boundary and storing said incremented aligned address in said third register, while storing said aligned address generated for said next read request in said second register;

(o) generating, external to said IOC, a next memory request to perform a memory read operation at a location specified by said incremented aligned address stored within said third register;

(p) at a completion of said memory read operation performed by said next memory request, buffering, external to said IOC, said read data in said second data register; and (o) repeating steps (i) through (p) until said IOC terminates reading data from said main memory.

14. A method as set forth in claim 13 wherein said memory boundary is a quad-word boundary, wherein a quad-word consists of sixteen bytes.

15. A method as set forth in claim 13 wherein said method includes, for each of said steps of generating a memory request, the steps of:

decoding, external to said IOC, a plurality of mark bits individual ones of which correspond to one byte of a data buffer used for buffering data during an IOC write to memory operation, individual ones of said mark bits being asserted to indicate that corresponding byte is a byte that is to be written to main memory; and responsive to a condition wherein none of said plurality of mark bits are asserted, performing a memory read operation.

* * * * *